(12) United States Patent
Lee et al.

(10) Patent No.: US 7,869,188 B2
(45) Date of Patent: Jan. 11, 2011

(54) CAPACITOR STRUCTURE

(75) Inventors: Keun-Bong Lee, Yongin-si (KR); Jung-Hyeon Kim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 528 days.

(21) Appl. No.: 11/998,132

(22) Filed: Nov. 28, 2007

(65) Prior Publication Data

US 2008/0123245 A1    May 29, 2008

(30) Foreign Application Priority Data

Nov. 29, 2006    (KR) .................. 10-2006-0119018

(51) Int. Cl.
*H01G 4/005* (2006.01)
*H01G 4/06* (2006.01)

(52) U.S. Cl. ...................... 361/303; 361/311

(58) Field of Classification Search ................ 361/311, 361/303, 306.1
See application file for complete search history.

(56) References Cited

U.S. PATENT DOCUMENTS

| | | |
|---|---|---|
| 6,713,806 B2 | 3/2004 | Wang et al. |
| 6,819,542 B2 | 11/2004 | Tsai et al. |
| 7,202,548 B2 * | 4/2007 | Lee ............................ 257/532 |
| 2004/0031982 A1 * | 2/2004 | Devries et al. .............. 257/307 |
| 2006/0124979 A1 | 6/2006 | Yun et al. |
| 2006/0157770 A1 | 7/2006 | Park |
| 2006/0226472 A1 | 10/2006 | Baek |

FOREIGN PATENT DOCUMENTS

| | | |
|---|---|---|
| JP | 2003-174104 A | 6/2003 |
| KR | 10-2004-0081677 A | 9/2004 |
| KR | 10-2006-0072412 A | 6/2006 |
| KR | 10-2006-0108290 A | 10/2006 |

* cited by examiner

*Primary Examiner*—Eric Thomas
(74) *Attorney, Agent, or Firm*—Mills & Onello, LLP

(57) ABSTRACT

A capacitor structure includes an insulating layer, first conductive patterns, second conductive patterns, an insulating interlayer, third conductive patterns, and fourth conductive patterns. The first and second conductive patterns are alternately arranged on the insulating layer to be spaced apart from one another. The first and second conductive patterns have side faces where concave portions and convex portions are formed. The insulating interlayer is formed on the insulating layer to cover the first and second conductive patterns. The third and fourth conductive patterns are alternately arranged on the insulating interlayer to be spaced apart from one another. The third and fourth conductive patterns have side faces where concave portions and convex portions are formed.

19 Claims, 16 Drawing Sheets

FIRST DIRECTION

SECOND DIRECTION

FIRST DIRECTION

SECOND DIRECTION

CAPACITOR STRUCTURE

CROSS-REFERENCE TO RELATED APPLICATIONS

This application claims priority under 35 U.S.C. §119 to Korean Patent Application No. 10-2006-0119018, filed on Nov. 29, 2006 in the Korean Intellectual Property Office (KIPO), the disclosure of which is incorporated herein by reference in its entirety.

BACKGROUND OF THE INVENTION

1. Field of the Invention

The present invention relates to a capacitor structure. More particularly, the present invention relates to a capacitor structure capable of storing a charge.

2. Description of the Related Art

FIG. 1 is a perspective view illustrating a conventional capacitor structure. Insulating portions of the capacitor structure are not depicted in FIG. 1 for convenience of explanation. That is, only conductive portions of the capacitor structure are depicted in FIG. 1.

Referring to FIG. 1, the conventional capacitor structure includes first conductive patterns 1a, second conductive patterns 1b, first contacts 3a, second contacts 3b, third conductive patterns 2a, fourth conductive patterns 2b, third contacts 4a, and fourth contacts 4b.

The first conductive patterns 1a and the second conductive patterns 1b extend in a first direction. The first and second conductive patterns 1a and 1b are alternately arranged in a second direction substantially perpendicular to the first direction such that the first and second conductive patterns 1a and 1b are spaced apart from one another.

The first conductive patterns 1a are vertically and repeatedly stacked. The first conductive patterns 1a are connected to one another by the first contacts 3a. The second conductive patterns 1b are vertically and repeatedly stacked. The second conductive patterns 1b are connected to one another by the second contacts 3b.

The third conductive patterns 2a and the fourth conductive patterns 2b are located over the first conductive patterns 1a and the second conductive patterns 1b. The third conductive patterns 2a and the fourth conductive patterns 2b extend in the second direction substantially perpendicular to the first direction. In addition, the third conductive patterns 2a and the fourth conductive patterns 2b are alternately arranged in the first direction.

The third conductive patterns 2a are vertically connected to each other by the third contacts 4a. In addition, the fourth conductive patterns 2b are vertically connected to each other by the fourth contacts 4b. Consequently, the first conductive patterns 1a, the first contacts 3a, the third conductive patterns 2a and the third contacts 4a form a first electric group. In addition, the second conductive patterns 1b, the second contacts 3b, the fourth conductive patterns 2b, and the fourth contacts 4b form a second electric group electrically insulated from the first electric group.

The conventional capacitor structure has a first capacitor, a second capacitor, a third capacitor and a fourth capacitor because the first electric group is electrically insulated from the second electric group. The first capacitor is horizontally formed between the first conductive patterns 1a and the second conductive patterns 1b. The second capacitor is horizontally formed between the third conductive patterns 2a and the fourth conductive patterns 2b. The third capacitor is vertically formed between the first conductive patterns 1a and the fourth conductive patterns 2b. The fourth capacitor is vertically formed between the second conductive patterns 1b and the third conductive patterns 2a.

As illustrated in FIG. 1, the first to fourth conductive patterns 1a, 1b, 2a and 2b have substantially bar shapes. Thus, areas of side faces of the first and second conductive patterns 1a and 1b horizontally corresponding to each other can be relatively small. As a result, the capacitance of the first capacitor is relatively small.

In addition, the third and fourth conductive patterns 2a and 2b that horizontally correspond to each other can have substantially bar shapes. Thus, areas of side faces of the third and fourth conductive patterns 2a and 2b horizontally corresponding to each other can be relatively small. As a result, the capacitance of the second capacitor is relatively small.

Furthermore, widths of the first to fourth conductive patterns 1a, 1b, 2a and 2b are relatively small because the first to fourth conductive patterns 1a, 1b, 2a and 2b have substantially bar shapes.

Thus, it is difficult to efficiently form the first contacts 3a, the second contacts 3b, the third contacts 4a, and the fourth contacts 4b on the first conductive patterns 1a, the second conductive patterns 1b, the third conductive patterns 2a and the fourth conductive patterns 2b, respectively.

SUMMARY OF THE INVENTION

In accordance with aspects of the present invention provides is a capacitor structure including a relatively large number of capacitors having relatively large capacitances.

In accordance with an aspect of the present invention, a capacitor structure includes an insulating layer, first conductive patterns, second conductive patterns, an insulating interlayer, third conductive patterns, and fourth conductive patterns. The first and second conductive patterns are alternately arranged on the insulating layer to be spaced apart from one another. The first and second conductive patterns have side faces where concave portions and convex portions are formed. The insulating interlayer is formed on the insulating layer to cover the first and second conductive patterns. The third and fourth conductive patterns are alternately arranged on the insulating interlayer to be spaced apart from one another. The third and fourth conductive patterns have side faces where concave portions and convex portions are formed.

The concave portions and the convex portions can be horizontally formed at the side faces of the first conductive patterns and correspond to the convex portions and concave portions, respectively, that are formed at the side faces of the second conductive patterns adjacent to the first conductive patterns. The concave portions and the convex portions can be horizontally formed at the side faces of the third conductive patterns and correspond to the convex portions and the concave portions, respectively, that are formed at the side faces of the fourth conductive patterns adjacent to the third conductive patterns.

The capacitor structure can further include a first conductive line electrically connected to end portions of the first conductive patterns and a second conductive line electrically connected to end portions of the second conductive patterns.

In this case, the capacitor structure can further include a third conductive line electrically connected to end portions of the third conductive patterns and a fourth conductive line electrically connected to end portions of the fourth conductive patterns. The third conductive line is electrically connected to the first conductive line. The fourth conductive line is electrically connected to the second conductive line.

The capacitor structure can further include first contacts formed through portions of the insulating interlayer where the first and third conductive patterns are overlapped, the first contacts connecting the first conductive patterns to the third conductive patterns and second contacts formed through portions of the insulating interlayer where the second and fourth conductive patterns are overlapped, the second contacts connecting the second conductive patterns to the fourth conductive patterns.

The first and second conductive patterns can extend in a first direction. The first and second conductive patterns can be alternately arranged to be spaced apart from one another in a second direction substantially perpendicular to the first direction. The first and second conductive patterns can alternately extend in third and fourth directions. The third direction can be rotated clockwise from the first direction by a first angle of between about 0° and about 90°. The fourth direction can be rotated counterclockwise from the first direction by a second angle of between about 0° and about 90°. The third and fourth conductive patterns can be substantially symmetric with respect to central axes of the first and second conductive patterns, respectively.

The capacitor structure can further include contacts formed through the insulating interlayer to vertically connect the third conductive structures and contacts formed through the insulating interlayer to vertically connect the fourth conductive structures. In this case, the insulating interlayer and the third and fourth conductive patterns can be repeatedly stacked to be symmetric with respect to the central axes.

The first and second conductive patterns can extend in a first direction. The first and second conductive patterns can be alternately arranged to be spaced apart from one another in a second direction substantially perpendicular to the first direction. The first and second conductive patterns can alternately extend in third and fourth directions. The third direction can be rotated clockwise from the first direction by a first angle of between about 0° and about 90°. The fourth direction can be rotated counterclockwise from the first direction by a second angle of between about 0° and about 90°. The third and fourth conductive patterns can have shapes of the first and second conductive patterns rotated clockwise by a predetermined angle of between about 0° and about 180°.

The capacitor structure can further include contacts formed through the insulating interlayer to vertically connect the third conductive structures and contacts formed through the insulating interlayer to vertically connect the fourth conductive structures. In this case, the insulating interlayer and the third and fourth conductive patterns can be repeatedly stacked and rotated by a predetermined angle with respect to the first direction.

The first and second conductive patterns can extend in a first direction. The first and second conductive patterns can alternately extend in a second direction substantially perpendicular to the first direction. The first conductive patterns have first planar portions spaced apart from one another and first connection portions connecting the first planar portions. The second conductive patterns have second planar portions spaced apart from one another and second connection portions connecting the second planar portions. The third and fourth conductive patterns have shapes of the third and fourth conductive patterns rotated clockwise by about 90° such that the third and fourth conductive patterns extend in the second direction. The third conductive patterns have third planar portions spaced apart from one another and third connection portions connecting the third planar portions. The fourth conductive patterns have fourth planar portions spaced apart from one another and fourth connection portions connecting the fourth planar portions. The first and second planar portions are overlapped with the third and fourth planar portions, respectively.

In this case, the first planar portions and the first connection portions of the first conductive patterns respectively correspond to the second connection portions and the second planar portions of the second conductive patterns adjacent to the first conductive patterns. The third planar portions and the third connection portions of the third conductive patterns respectively correspond to the fourth connection portions and the fourth planar portions of the fourth conductive patterns adjacent to the third conductive patterns.

The first and second planar portions have a first width in the second direction. The first and second connection portions have a second width in the second direction, the second width can be substantially smaller than the first width.

Widths of central portions of the first and second planar portions can be substantially larger than widths of end portions of the first and second planar portions connected to the first and second connection portions.

The capacitor structure can further include first and second contacts. The first contacts can be formed through a portion of the insulating interlayer where the first planar portions and the third planar portions are overlapped. The first contacts electrically connect the first planar portions to the third planar portions. The second contacts can be formed through a portion of the insulating interlayer where the second planar portions and the fourth planar portions are overlapped. The second contacts electrically connect the second planar portions to the fourth planar portions.

The capacitor structure can further include contacts formed through the insulating interlayer to vertically connect the third conductive patterns and contacts formed through the insulating interlayer to vertically connect the fourth conductive patterns. The insulating interlayer and the third and fourth conductive patterns are repeatedly stacked to be rotated clockwise by 90° with respect to the first direction.

The capacitor can further include a first conductive line electrically connected to end portions of odd-numbered first and second conductive patterns and a second conductive line electrically connected to end portions of even-numbered first and second conductive patterns.

In this case, the capacitor structure can further include a third conductive line electrically connected to end portions of odd-numbered third and fourth conductive patterns and a fourth conductive line electrically connected to end portions of even-numbered third and fourth conductive patterns. The third conductive line can be electrically connected to the first conductive line. The fourth conductive line can be electrically connected to the second conductive line.

The capacitor structure can further include first contacts formed through portions of the insulating interlayer where odd-numbered first and second conductive patterns are overlapped with odd-numbered third and fourth conductive patterns to electrically connect the odd-numbered first and second conductive patterns to the odd-numbered third and fourth conductive patterns; and second contacts formed through portions of the insulating interlayer where even-numbered first and second conductive patterns are overlapped with even-numbered third and fourth conductive patterns to electrically connect the even-numbered first and second conductive patterns to the even-numbered third and fourth conductive patterns.

The first and second conductive patterns can have shapes extending in a first direction. The first conductive patterns have planar portions spaced apart from each other and connection portions connecting the planar portions. The planar portions have a first width. The connection portions have a second width substantially smaller than the first width. A width of the second conductive patterns is substantially uniformly maintained. The number of second conductive patterns located between adjacent two first conductive patterns is at least two. A distance between the first and second conductive patterns and a distance between the second conductive patterns between the adjacent two first conductive patterns are each substantially uniformly maintained. The third and fourth conductive patterns have shapes of the first and second conductive patterns, respectively, rotated clockwise by a predetermined angle of between about 0° and about 180°.

The capacitor structure can further include contacts formed through the insulating interlayer to vertically connect the odd-numbered third conductive patterns and to vertically connect the odd-numbered fourth conductive patterns and contacts formed through the insulating interlayer to vertically connect the even-numbered third conductive patterns and to vertically connect the even-numbered fourth conductive patterns. In this case, the insulating interlayer and the third and fourth conductive patterns are repeatedly stacked to be rotated clockwise by a predetermined angle of between about 0° and about 180° with respect to the first direction.

According to aspects of the present invention, areas of side faces of two conductive patterns that form a capacitor can increase. Thus, the capacitance between the conductive patterns can also increase.

In addition, the conductive patterns can have at least one planar portion on which contacts are to be formed. Thus, the size of the contacts can be enlarged. In addition, processes such as an etching process or a photolithography processes can be efficiently performed to form the contacts.

BRIEF DESCRIPTION OF THE DRAWINGS

Aspects of the present invention will become readily apparent by reference to the following detailed description when considered in conjunction with the accompanying drawings in which.

DESCRIPTION OF THE EMBODIMENTS

Figure 1:
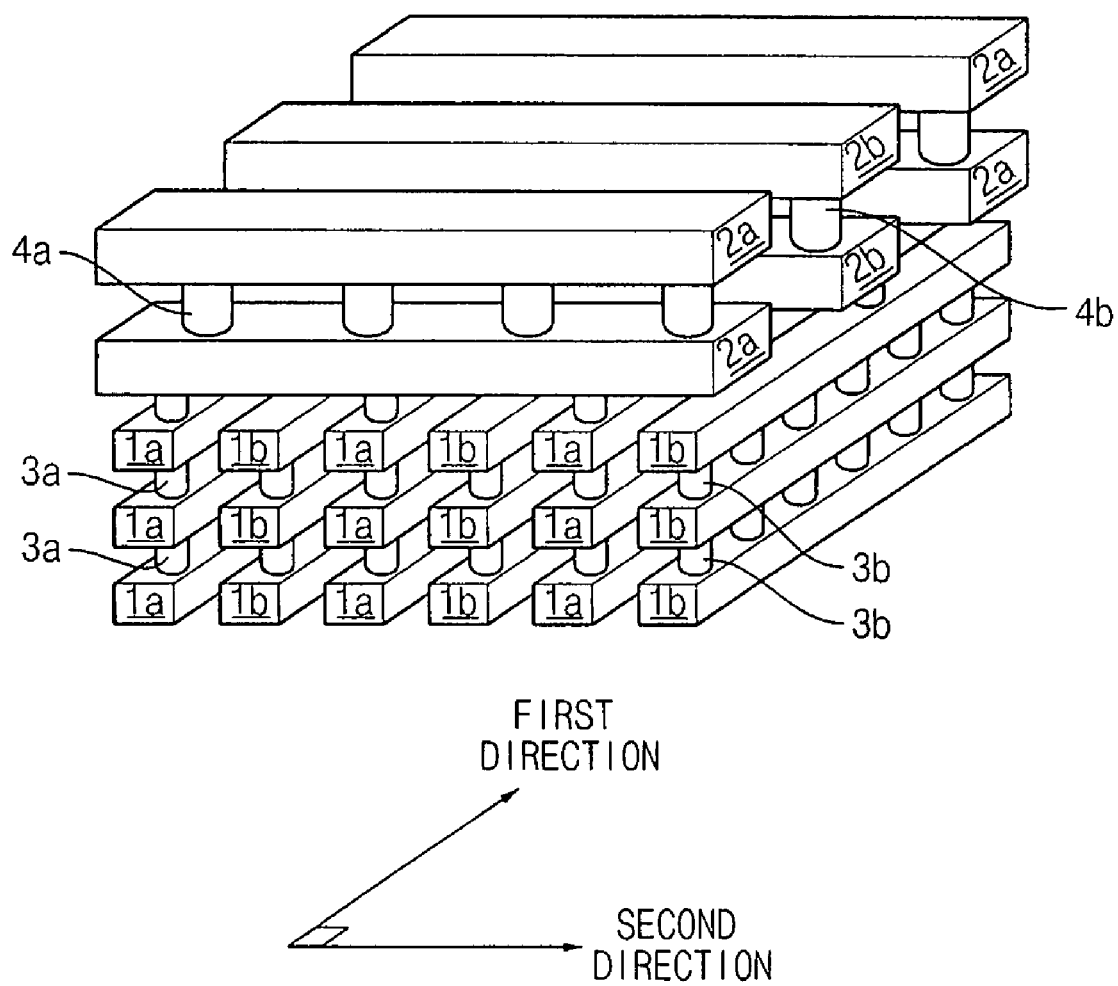
FIG. 1 is a perspective view illustrating a conventional capacitor structure.

Embodiments in accordance with the present invention will be described with reference to the accompanying drawings. The present invention can, however, be embodied in many different forms and should not be construed as limited to the embodiments set forth herein. The principles and features of this invention may be employed in varied and numerous embodiments without departing from the scope of the present invention. In the drawings, the size and relative sizes of layers and regions may be exaggerated for clarity. The drawings are not necessarily to scale. Like reference numerals designate like elements throughout the drawings.

It will also be understood that when an element or layer is referred to as being "on," "connected to" and/or "coupled to" another element or layer, the element or layer may be directly on, connected and/or coupled to the other element or layer or intervening elements or layers may be present. In contrast, when an element is referred to as being "directly on," "directly connected to" and/or "directly coupled to" another element or layer, no intervening elements or layers are present. As used herein, the term "and/or" may include any and all combinations of one or more of the associated listed items.

It will also be understood that, although the terms first, second, etc. may be used herein to describe various elements, components, regions, layers and/or sections. These elements, components, regions, layers and/or sections should not be limited by these terms. These terms may be used to distinguish one element, component, region, layer and/or section from another element, component, region, layer and/or section. For example, a first element, component, region, layer and/or section discussed below could be termed a second element, component, region, layer and/or section without departing from the teachings of the present invention.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device can be otherwise oriented (e.g., rotated 90 degrees or at other orientations) and the spatially relative descriptors used herein interpreted accordingly.

The terminology used herein is for the purpose of describing particular embodiments only and is not intended to be limiting of the invention. As used herein, the singular terms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

Embodiments in accordance with the present invention are described with reference to cross-section illustrations that are schematic illustrations of idealized embodiments thereof. As such, variations from the shapes of the illustrations as a result, for example, of manufacturing techniques and/or tolerances, are to be expected. Thus, the embodiments provided herein should not be construed as limited to the particular shapes of regions illustrated herein, but are to include deviations in shapes that result, for example, from manufacturing. For example, a region illustrated as a rectangle will, typically, have rounded or curved features. Thus, the regions illustrated in the figures are schematic in nature of a device and are not intended to limit the scope of the present invention.

Figure 2:
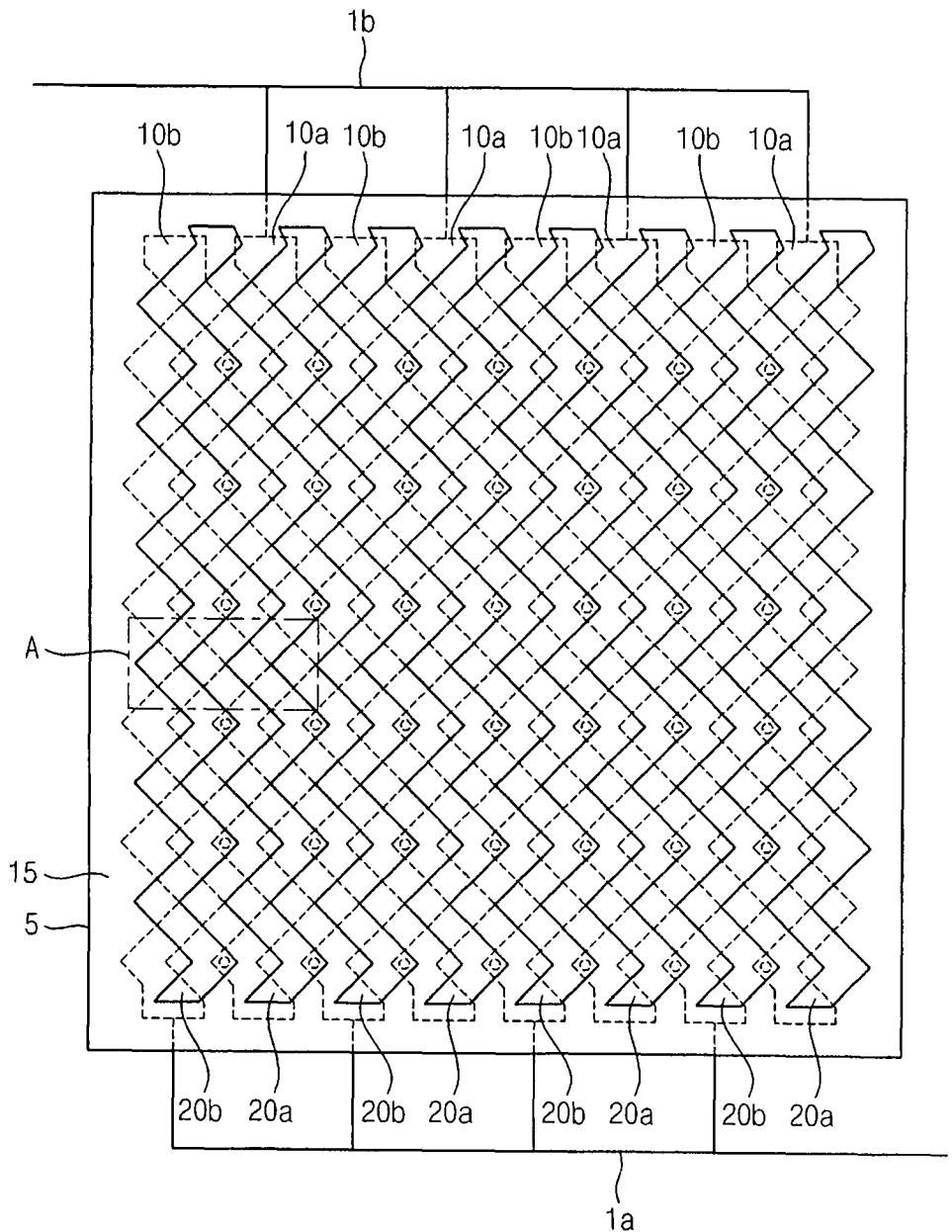
FIG. 2 is a plan view illustrating an embodiment of a capacitor structure in accordance with an aspect of the present invention.

FIG. 2 is a plan view illustrating an embodiment of a capacitor structure in accordance with an aspect of the present invention.

Referring to FIG. 2, a capacitor structure includes an insulating layer 5, first conductive patterns 10a, second conductive patterns 10b, an insulating interlayer 15, third conductive patterns 20a, and fourth conductive patterns 20b.

The insulating layer 5 can include an insulating material such as silicon nitride and silicon oxide. The first and second conductive patterns 10a and 10b can include a metal such as copper (Cu), aluminum (Al), and platinum (Pt). These can be used alone or in combination.

First and second conductive patterns 10a and 10b can have a "zigzag" shape extending in a first direction on the insulating layer 5. Particularly, the first and second conductive patterns 10a and 10b alternately extend in third and fourth directions, in this embodiment. The third direction is rotated clockwise from the first direction by a first angle θ1. The fourth direction is rotated counterclockwise from the first direction by a second angle θ2. Here, the first and second angles θ1 and θ2 can be between about 0° and about 90°. However, the first and second angles θ1 and θ2 in FIG. 2 are depicted as 45° for convenience of explanation.

As illustrated in FIG. 2, concave portions formed at side faces of the first conductive patterns 10a horizontally correspond to convex portions formed at side faces of the second conductive patterns 10b. In addition, convex portions formed at the side faces of the first conductive patterns 10a horizontally correspond to concave portions formed at the side faces of the second conductive patterns 10b. In this case, the number of first and second conductive patterns 10a and 10b formed on the insulating layer 5 can increase.

The first conductive patterns 10a can be electrically connected to one another by a first conductive line 1a connected to end portions of the first conductive patterns 10a. The second conductive patterns 10b can be electrically connected to one another by a second conductive line 1b connected to end portions of the second conductive patterns 10b.

That is, the first conductive patterns 10a are electrically connected to one another by the first conductive line 1a. In addition, the second conductive patterns 10b are electrically connected to one another by the second conductive line 1b. However, the first conductive patterns 10a are electrically insulated from the second conductive patterns 10b.

The insulating interlayer 12 is provided on the insulating layer 5 to cover the first and second conductive patterns 10a and 10b. The insulating interlayer 15 can include an insulating material such as silicon nitride and silicon oxide.

As described above, the first conductive patterns 10a and the second conductive patterns 10b are electrically insulated from each other. In addition, spaces between the first conductive patterns 10a and the second conductive patterns 10b are filled with the insulating interlayer 15. Thus, the first conductive patterns 10a, the insulating interlayer 15, and the second conductive patterns 10b horizontally form a capacitor.

First contacts 16a and second contacts 16b are provided through the insulating interlayer 15 to be electrically connected to the first conductive patterns 10a and the second conductive patterns 10b, respectively. The first and second contacts 16a and 16b can include a metal such as tungsten (W) and copper (Cu). These can be used alone or in combination.

Particularly, the first contacts 16a are formed through a portion of the insulating interlayer 15 where the first conductive patterns 10a and the third conductive patterns 20a that are subsequently formed are overlapped. The second contacts 16b are formed through a portion of the insulating interlayer 15 where the second conductive patterns 10b and the fourth conductive patterns 20b that are subsequently formed.

The third and fourth conductive patterns 20a and 20b are provided on the insulating interlayer 15. The third and fourth conductive patterns 20a and 20b can include a conductive material substantially the same as that included in the first and second conductive patterns 10a and 10b.

The shape of the third conductive patterns 20a can be symmetric with respect to that of the first conductive patterns 10a. That is, the third conductive patterns 20a can have a shape formed by allowing the first conductive patterns 10a to be symmetric with respect to a central axis of the first conductive patterns 10a. The shape of the fourth conductive patterns 20b can be symmetric with respect to that of the second conductive patterns 10b. That is, the fourth conductive patterns 20b can have a shape formed by allowing the second conductive patterns 10b to be symmetric with respect to a central axis of the second conductive patterns 10b. The third conductive patterns 20a and the fourth conductive patterns 20b are alternately arranged in the second direction such that the third conductive patterns 20a and the fourth conductive patterns 20b are spaced apart from one another.

Concave portions formed at side faces of the third conductive patterns 20a can horizontally correspond to convex portions formed at side faces of the fourth conductive patterns 20b. In addition, convex portions formed at the side faces of the third conductive patterns 20a can horizontally correspond to concave portions formed at the side faces of the fourth conductive patterns 20b. In this case, the numbers of third and fourth conductive patterns 20a and 20b can increase.

Here, the first conductive patterns 10a and the third conductive patterns 20a are electrically connected to each other by first contacts 16a. The second conductive patterns 10b and the fourth conductive patterns 20b are electrically connected to each other by second contacts 16b.

Alternatively, the first contacts 16a need not be formed. In this case, a third conductive line electrically connected to end portions of the third conductive patterns 20a is formed. The third conductive line is then connected to the first conductive line 1a.

In addition, the second contacts 16b need not be formed. In this case, a fourth conductive line electrically connected to end portions of the fourth conductive patterns 20b are formed. The fourth conductive line is then connected to the second conductive line 1b.

The first conductive patterns 10a are not electrically connected to the fourth conductive patterns 20b. In addition, the second conductive patterns 10b are not electrically connected to the third conductive patterns 20a.

That is, the first and third conductive patterns 10a and 20a that are electrically connected to each other can form a first electric group. In addition, the second and fourth conductive patterns 10b and 20b that are electrically connected to each other can form a second electric group insulated from the first electric group.

Figure 3:
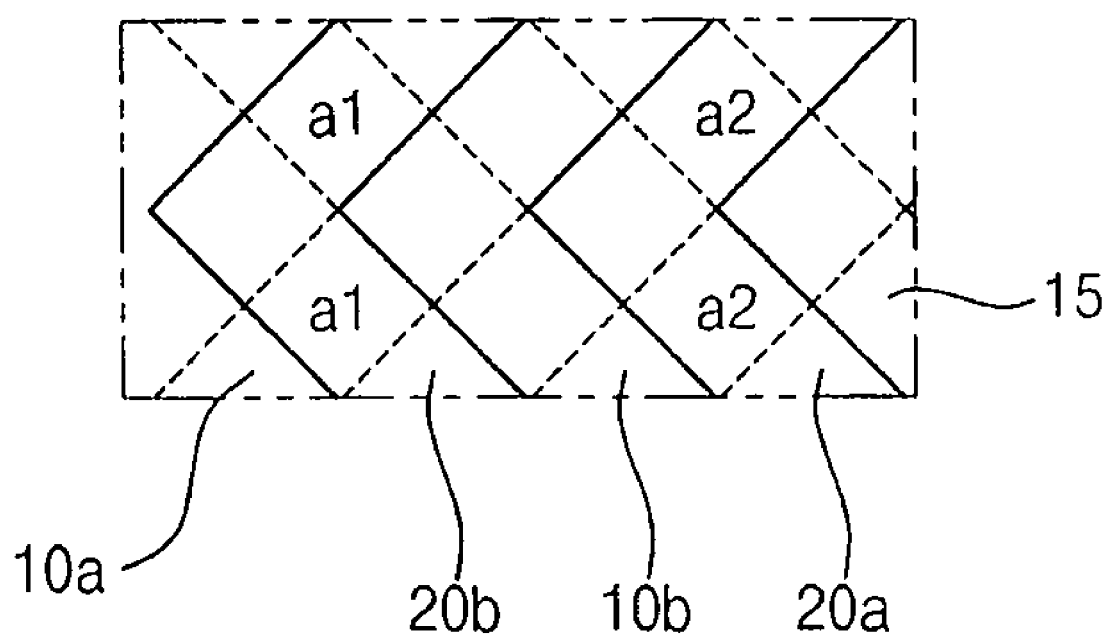
FIG. 3 is an enlarged view of a portion "A" in FIG. 2.

FIG. 3 is an enlarged view of a portion "A" in FIG. 2.

Referring to FIG. 3, the insulating interlayer 15 and the second conductive patterns 10b are subsequently located under the third conductive patterns 20a. The insulating interlayer 15 and the first conductive patterns 10a are subsequently located under the fourth conductive patterns 20b.

As described above, the third conductive patterns 20a are electrically insulated from the second conductive patterns 10b. Thus, the third conductive patterns 20a, the insulating interlayer 15, and the second conductive patterns 10b can vertically form a capacitor.

In addition, the fourth conductive patterns 20b are electrically insulated from the first conductive patterns 10a. Thus, the fourth conductive patterns 20b, the insulating interlayer 15, and the first conductive patterns 10a can vertically form a capacitor.

As described above, the insulating interlayer 15 and the third and fourth conductive patterns 20a and 20b can be stacked once. Alternatively, the insulating interlayer 15 and the third and fourth conductive patterns 20a and 20b can be stacked at least twice. In this case, each time the third and fourth conductive patterns 20a and 20b are stacked, the stacked third and fourth conductive patterns 20a and 20b become symmetric with respect to the previous third and fourth conductive patterns 20a and 20b. In addition, the contacts or the conductive line can be repeatedly provided.

Hereinafter, a method of manufacturing a capacitor structure in FIG. 2 is described.

Figure 4:
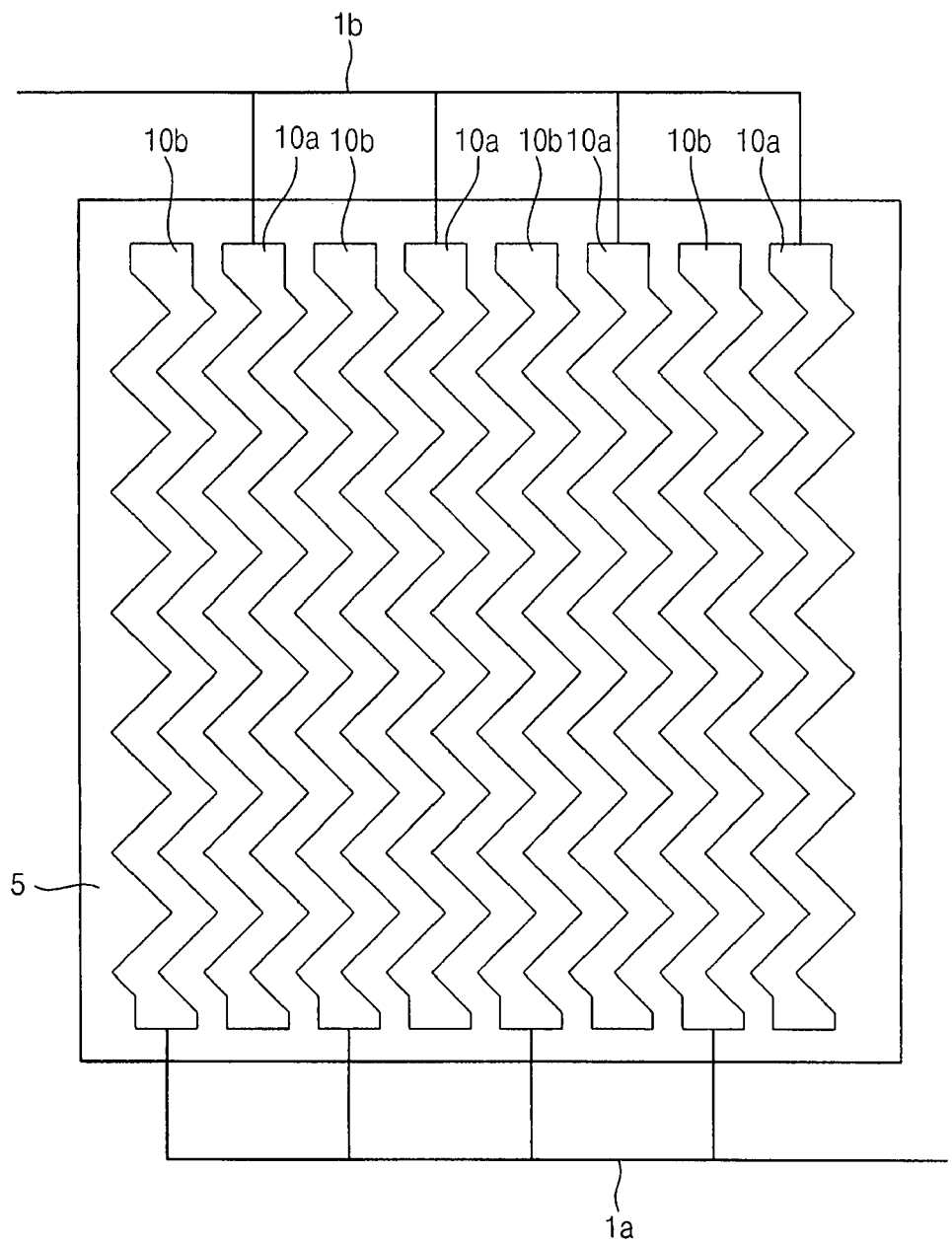
FIGS. 4 to 6 are plan views illustrating an embodiment of a method of manufacturing the capacitor structure in FIG. 2.
Figure 4:
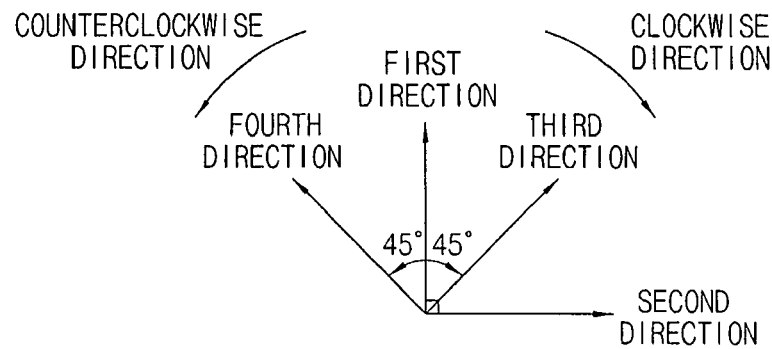
Figure 5:
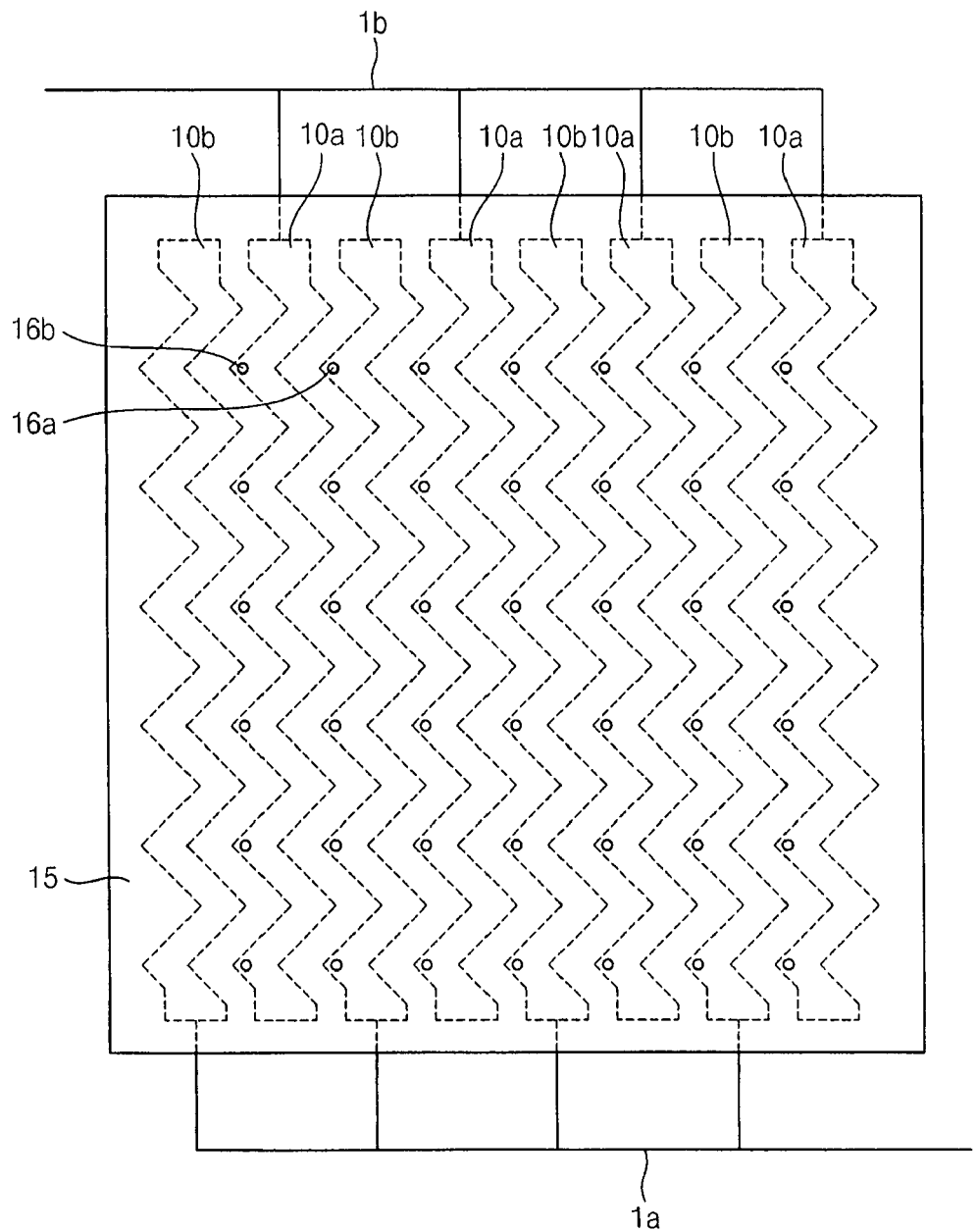
Figure 5:
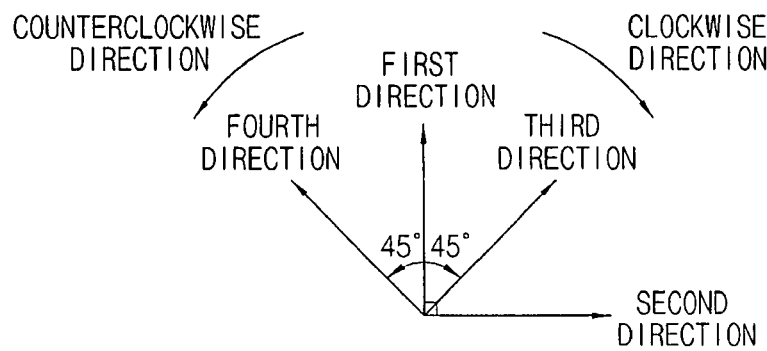
Figure 6:
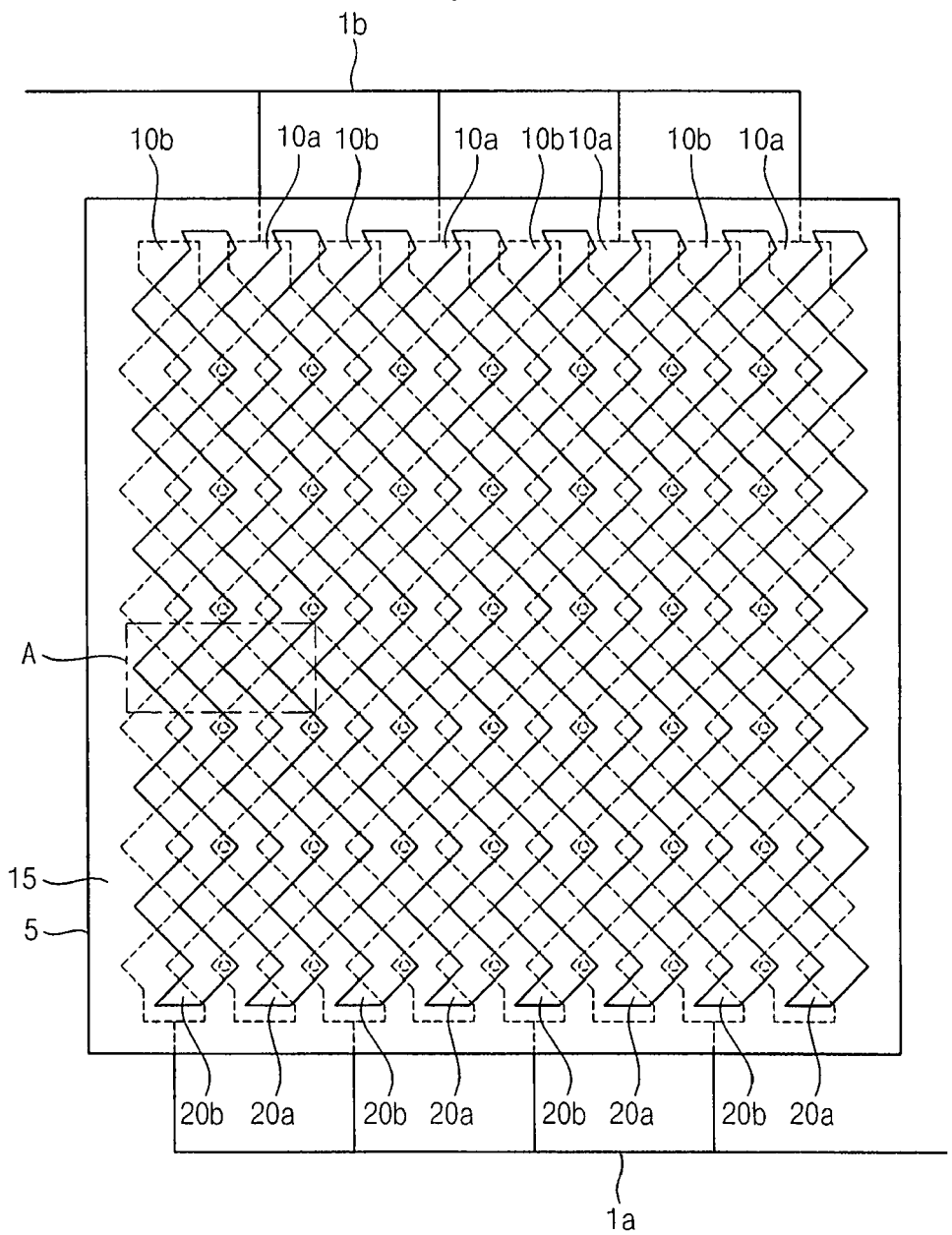
Figure 6:
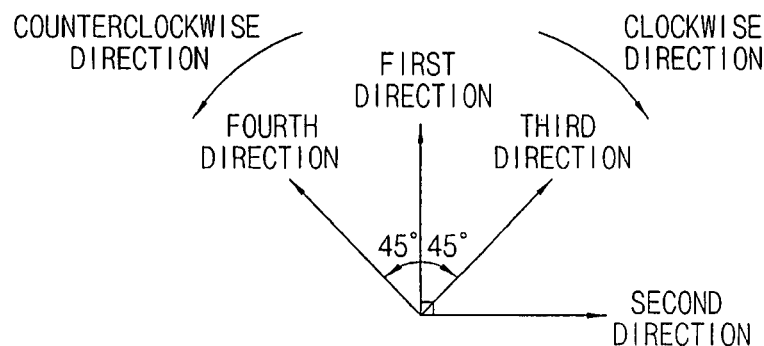

FIGS. 4 to 6 are plan views illustrating an embodiment of a method of manufacturing the capacitor structure in FIG. 2.

Referring to FIG. 4, first and second conductive patterns 10a and 10b are formed on an insulating layer 5. The first and second conductive patterns 10a and 10b can be formed using a metal such as copper (Cu), aluminum (Al) or platinum (Pt). These metals can be used alone or in combination.

The first and second conductive patterns 10a and 10b can have zigzag shapes extending in a first direction on the insulating layer 5. Particularly, the first and second conductive patterns 10a and 10b extend in third and fourth directions. The third direction is rotated clockwise by a first angle $\theta 1$ with respect to the first direction. The fourth direction is rotated counterclockwise by a second angle $\theta 2$ with respect to the first direction. The first and second angles $\theta 1$ and $\theta 2$ can be between about 0° and about 90°. However, the first and second angles $\theta 1$ and $\theta 2$ in FIG. 2 are depicted as 45° for convenience of explanation.

As illustrated in FIG. 4, concave portions formed at side faces of the first conductive patterns 10a horizontally correspond to convex portions formed at side faces of the second conductive patterns 10b. In addition, convex portions formed at the side faces of the first conductive patterns 10a horizontally correspond to concave portions formed at the side faces of the second conductive patterns 10b. In this case, the numbers of first and second conductive patterns formed on the insulating layer 5 can increase.

The first conductive patterns 10a are electrically connected to one another by a first conductive line 1a connected to end portions of the first conductive patterns 10a. Here, the first conductive line 1a can be integrally formed with the first conductive patterns 10a. Alternatively, the first conductive line 1a and the first conductive patterns 10a can be formed by different processes.

The second conductive patterns 10b are electrically connected to one another by a second conductive line 1b connected to end portions of the second conductive patterns 10b. Here, the second conductive line 1b can be integrally formed with the second conductive patterns 10b. Alternatively, the second conductive line 1b and the second conductive patterns 10b can be formed by different processes.

That is, the first conductive patterns 10a are electrically connected to one another by the first conductive line 1a. In addition, the second conductive patterns 10b are electrically connected to one another by the second conductive line 1b. However, the first conductive patterns 10a can be electrically insulated from the second conductive patterns 10b.

Referring to FIG. 5, an insulating interlayer 15 is formed on the insulating layer 5 to cover the first and second conductive patterns 10a and 10b. The insulating interlayer 15 can be formed using an insulating material such as silicon nitride or silicon oxide.

As described above, the first conductive patterns 10a and second conductive patterns 10b are electrically insulated from each other. In addition, a space between the first conductive patterns 10a and the second conductive patterns 10b is filled with the insulating interlayer 15. Thus, the first conductive patterns 10a, the insulating interlayer 15 and the second conductive patterns 10b can horizontally form a capacitor.

After the insulating interlayer 15 is formed, first contacts 16a and second contacts 16b are formed through the insulating interlayer 15 to be electrically connected to the first conductive patterns 10a and the second conductive patterns 10b. The first and second contacts 16a and 16b can include a metal such as tungsten (W) or copper (Cu). These metals can be used alone or in combination.

Particularly, the first contacts 16a are formed through a portion of the insulating interlayer 15 where the first conductive patterns 10a are overlapped with the third conductive patterns 20a (see FIG. 6) that are subsequently formed. The second contacts 16b are formed through a portion of the insulating interlayer 15 where the second conductive patterns 10b are overlapped with the fourth conductive patterns 20a (see FIG. 6) that are subsequently formed.

Referring to FIG. 6, the third and fourth conductive patterns 20a and 20b are formed on the insulating interlayer 15. The third and fourth conductive patterns 20a and 20b can include a conductive material substantially the same as that included in the first and second conductive patterns 10a and 10b.

The third conductive patterns 20a and the first conductive patterns 10a are substantially symmetric with respect to the first direction. The fourth conductive patterns 20b and the second conductive patterns 10b are substantially symmetric with respect to the first direction.

The third conductive patterns 20a and the fourth conductive patterns 20b can have substantially the same shapes. In addition, the third and fourth conductive patterns 20a and 20b are alternately arranged in the second direction such that the third and fourth conductive patterns 20a and 20b are spaced apart from one another.

As illustrated in FIG. 6, concave portions formed at side faces of the third conductive patterns 20a can horizontally correspond to convex portions formed at side faces of the fourth conductive patterns 20b. In addition, convex portions formed at the side faces of the third conductive patterns 20a can horizontally correspond to concave portions formed at the side faces of the fourth conductive patterns 20b. In this case, the numbers of third and fourth conductive patterns 20a and 20b can increase.

Here, the first conductive patterns 10a are electrically connected to the third conductive patterns 20a by the first contacts 16a. The second conductive patterns 10b are electrically connected to the fourth conductive patterns 20b by the second contacts 16b.

Alternatively, the first contacts 16a need not be formed. In this case, a third conductive line electrically connected to end portions of the third conductive patterns 20a is formed. The third conductive line is then connected to the first conductive line 1a.

In addition, the second contacts 16b need not be formed. In this case, a fourth conductive line electrically connected to end portions of the fourth conductive patterns 20b is formed. The fourth conductive line is then connected to the second conductive line 1b.

The first conductive patterns 10a are not electrically connected to the fourth conductive patterns 20a. The second conductive patterns 10b are not electrically connected to the third conductive patterns 20a.

That is, the first and third conductive patterns 10a and 20a that are electrically connected to each other can form a first electric group. In addition, the second and fourth conductive patterns 10b and 20b that are electrically connected to each other can form a second electric group.

Figure 7:
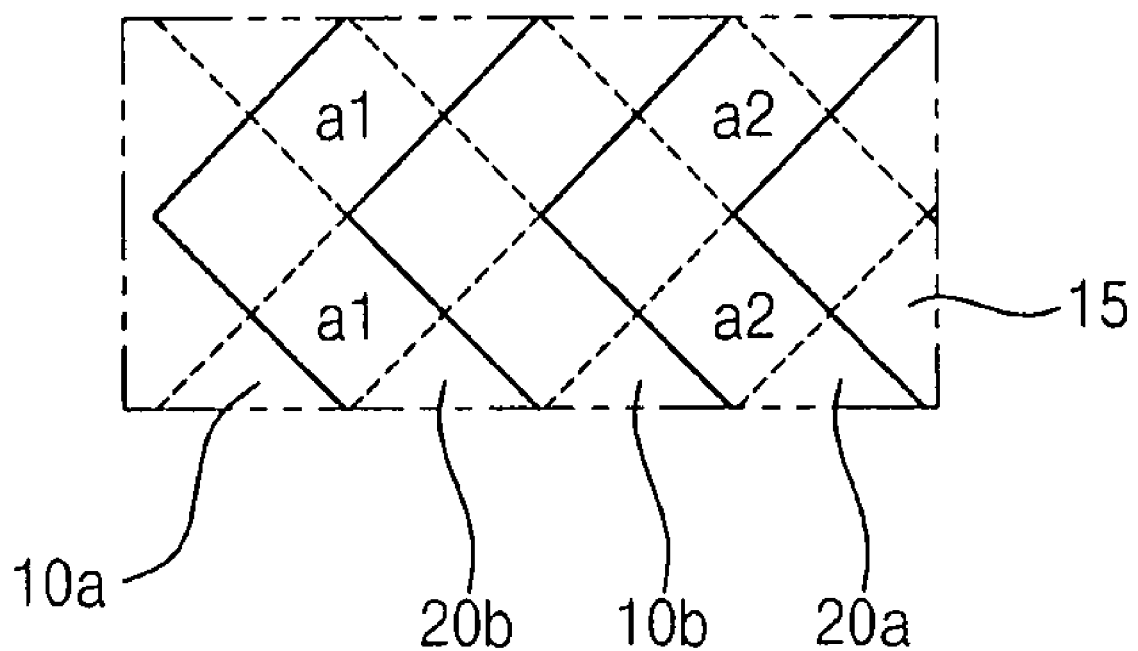
FIG. 7 is an enlarged view of a portion "A" in FIG. 6.

FIG. 7 is an enlarged view of a portion "A" in FIG. 6.

Referring to FIG. 7, the insulating interlayer 15 and the second conductive patterns 10b are subsequently located under the third conductive patterns 20a. In addition, the insulating interlayer 15 and the first conductive patterns 10a are subsequently located under the fourth conductive patterns 20b.

As described above, the third conductive patterns 20a, the insulating interlayer 15 and the second conductive patterns 10b can vertically form a capacitor structure because the third conductive patterns 20a are electrically insulated from the second conductive patterns 10b.

The fourth conductive patterns 20b, the insulating interlayer 15, and the first conductive patterns 10a vertically form a capacitor structure because the fourth conductive patterns 20b are electrically insulated from the first conductive patterns 10a.

As described above, the insulating interlayer 15 and the third and fourth conductive patterns 20a and 20b can be stacked once. Alternatively, the insulating interlayer 15 and the third and fourth conductive patterns 20a and 20b can be stacked at least twice. In this case, each time the third and fourth conductive patterns 20a and 20b are stacked, the stacked third and fourth conductive patterns 20a and 20b become symmetric with respect to the previous third and fourth conductive patterns 20a and 20b. In addition, the contacts or the conductive line can be repeatedly provided.

Figure 8:
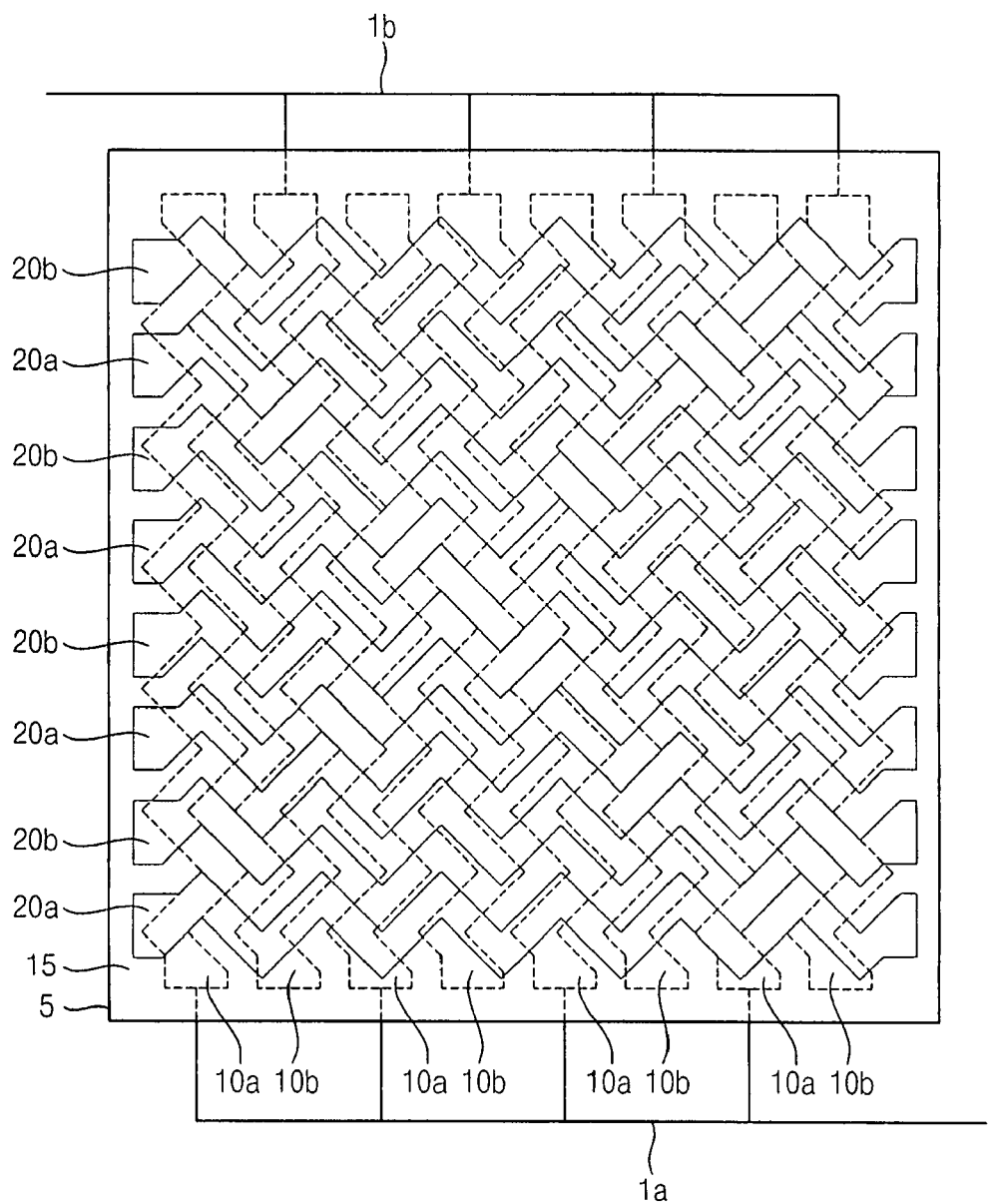
FIG. 8 is a plan view illustrating an embodiment of a capacitor structure in accordance with another aspect of the present invention.
Figure 8:
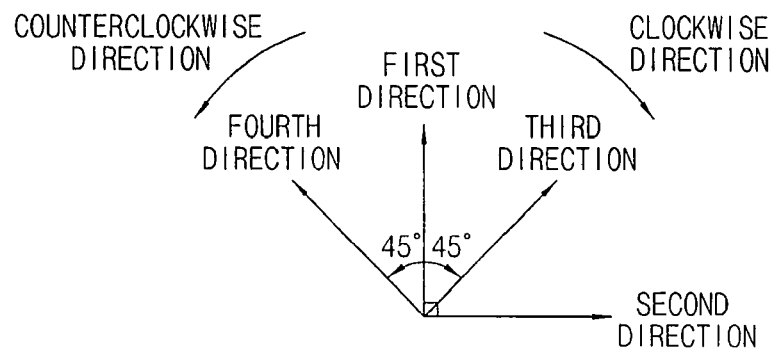

FIG. 8 is a plan view illustrating an embodiment of a capacitor structure in accordance with an aspect of the present invention.

Referring to FIG. 8, a capacitor structure includes an insulating layer 5, first conductive patterns 10a, second conductive patterns 10b, an insulating interlayer 15, third conductive patterns 20a, and fourth conductive patterns 20b.

The insulating layer 5, the first conductive patterns 10a and the second conductive patterns 10b are substantially the same as the insulating layer 5, the first conductive patterns 10a, and the second conductive patterns 10b in FIG. 2. Thus, any further explanation will be omitted.

The third and fourth conductive patterns 20a and 20b are provided on the insulating interlayer 15. Particularly, the third conductive patterns 20a have the shape of the first conductive patterns 10a rotated clockwise by a third angle θ3. The fourth conductive patterns 20a have the shape of the second conductive patterns 20a rotated clockwise by the third angle θ3.

Figure 11:
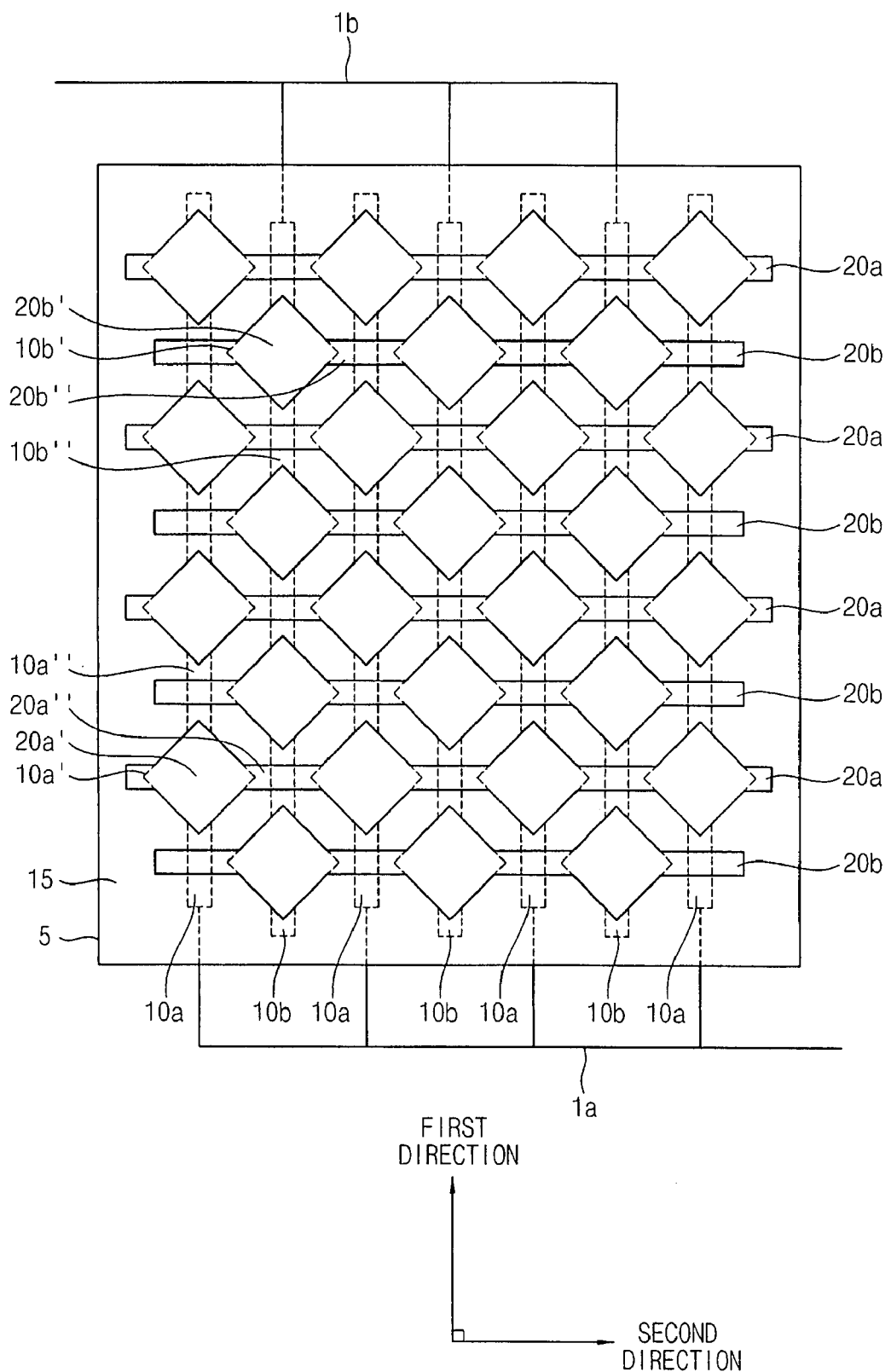
FIG. 11 is a plan view illustrating an embodiment of a capacitor structure in accordance with an aspect of the present invention.

The third angle θ3 can be between about 0° and about 180°. However, the third angle θ3 in FIG. 11 is depicted as 90° for convenience of explanation. The third and fourth conductive patterns 20a and 20b are alternately arranged in the second direction such that the third and fourth conductive patterns 20a and 20b are spaced apart from one another.

Concave portions formed at side faces of the third conductive patterns 20a can horizontally correspond to convex portions formed at side faces of the fourth conductive patterns 20b. In addition, convex portions formed at the side faces of the third conductive patterns 20a can horizontally correspond to convex portions of the side faces of the fourth conductive patterns 20b. In this case, the numbers of third and fourth conductive patterns 20a and 20b can increase.

Although not illustrated in the drawings, first and second contacts can be provided. The first contacts are formed through the insulating interlayer 15 so that the first and third conductive patterns 10a and 20a can be electrically connected to each other. The second contacts are formed through the insulating interlayer 15 so that the second and fourth conductive patterns 10b and 20b are electrically connected to each other.

The first contacts can be provided through a portion of the insulating interlayer 15 where the first conductive patterns 10a are overlapped with the third conductive patterns 20a. The second contacts can be provided through a portion of the insulating interlayer 15 where the second conductive patterns 10b are overlapped with the fourth conductive patterns 20b.

Alternatively, the first contacts need not be formed. In this case, a third conductive line electrically connected to end portions of the third conductive patterns 20a is formed. The third conductive line is then connected to the first conductive line 1a.

In addition, the second contacts need not be formed. In this case, a fourth conductive line electrically connected to end portions of the fourth conductive patterns 20b is formed. The fourth conductive line is then connected to the second conductive line 1b.

The first conductive patterns 10a need not be electrically connected to the fourth conductive patterns 20a. In addition, the second conductive patterns 10b are not electrically connected to the third conductive patterns 20a.

That is, the first and third conductive patterns 10a and 20a can form a first electric group. The second and fourth conductive patterns 10a and 20b that are electrically connected to each other can form a second electric group electrically insulated from the first electric group.

As described above, the insulating interlayer 15 and the third and fourth conductive patterns 20a and 20b can be stacked once. Alternatively, the insulating interlayer 15 and the third and fourth conductive patterns 20a and 20b can be stacked at least twice. In this case, each time the third and fourth conductive patterns 20a and 20b are stacked, the stacked third and fourth conductive patterns 20a and 20b can be rotated clockwise by a predetermined angle between about 0° and about 180°. In addition, the contacts or the conductive line can be repeatedly provided.

Hereinafter, an embodiment of a method of forming the capacitor structure in FIG. 8 is described.

Figure 9:
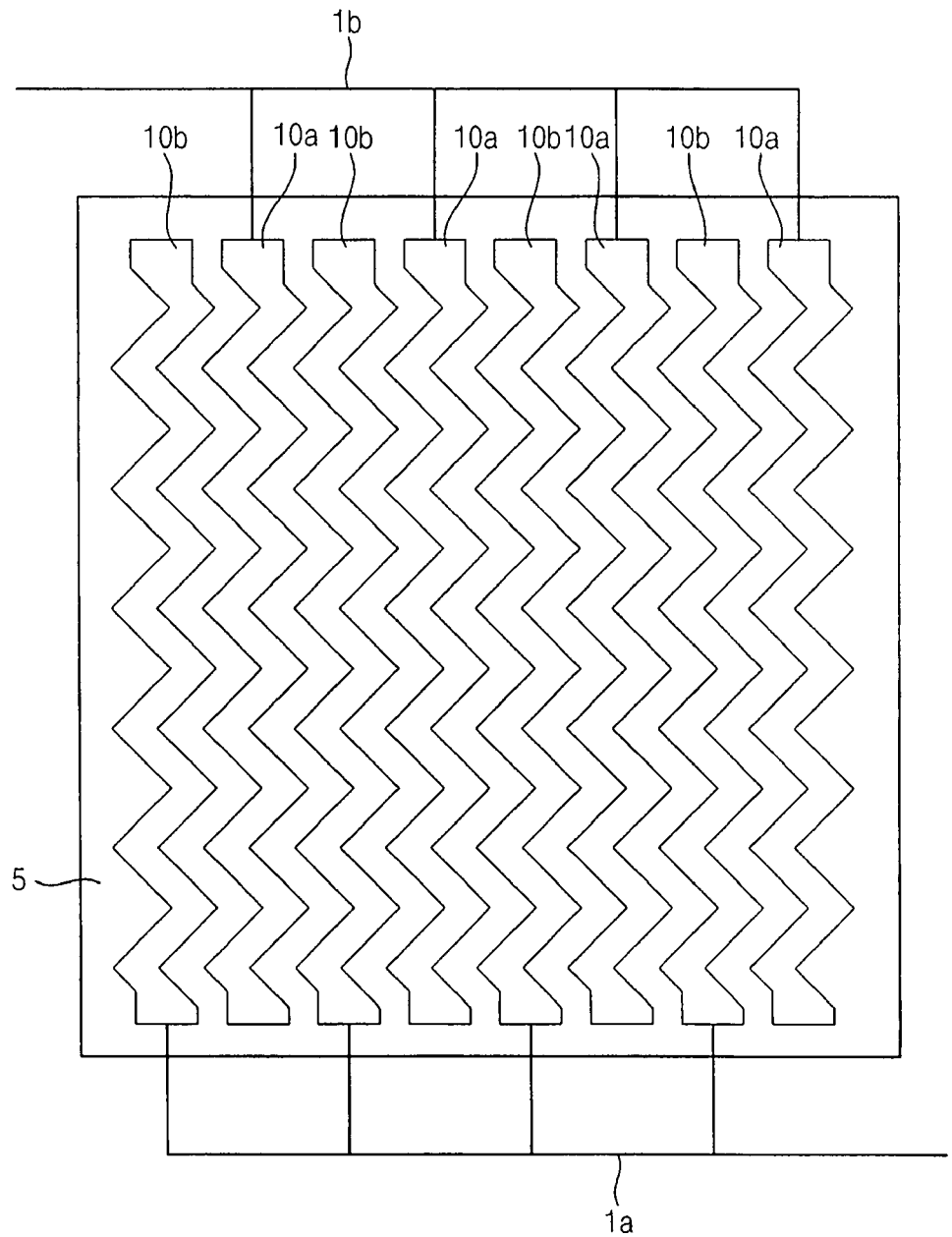
FIGS. 9 and 10 are plan views illustrating an embodiment of a method of forming the capacitor structure in FIG. 8.
Figure 9:
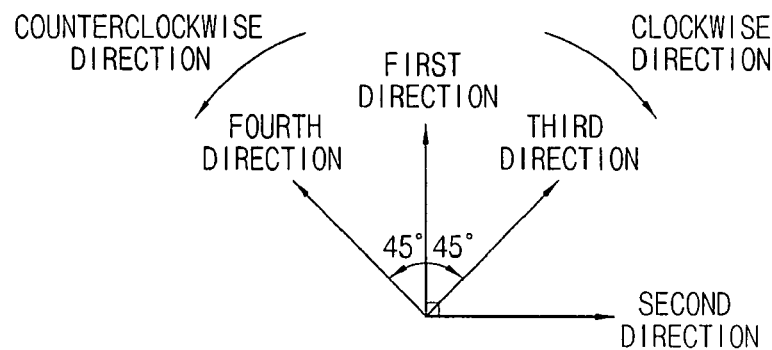
Figure 10:
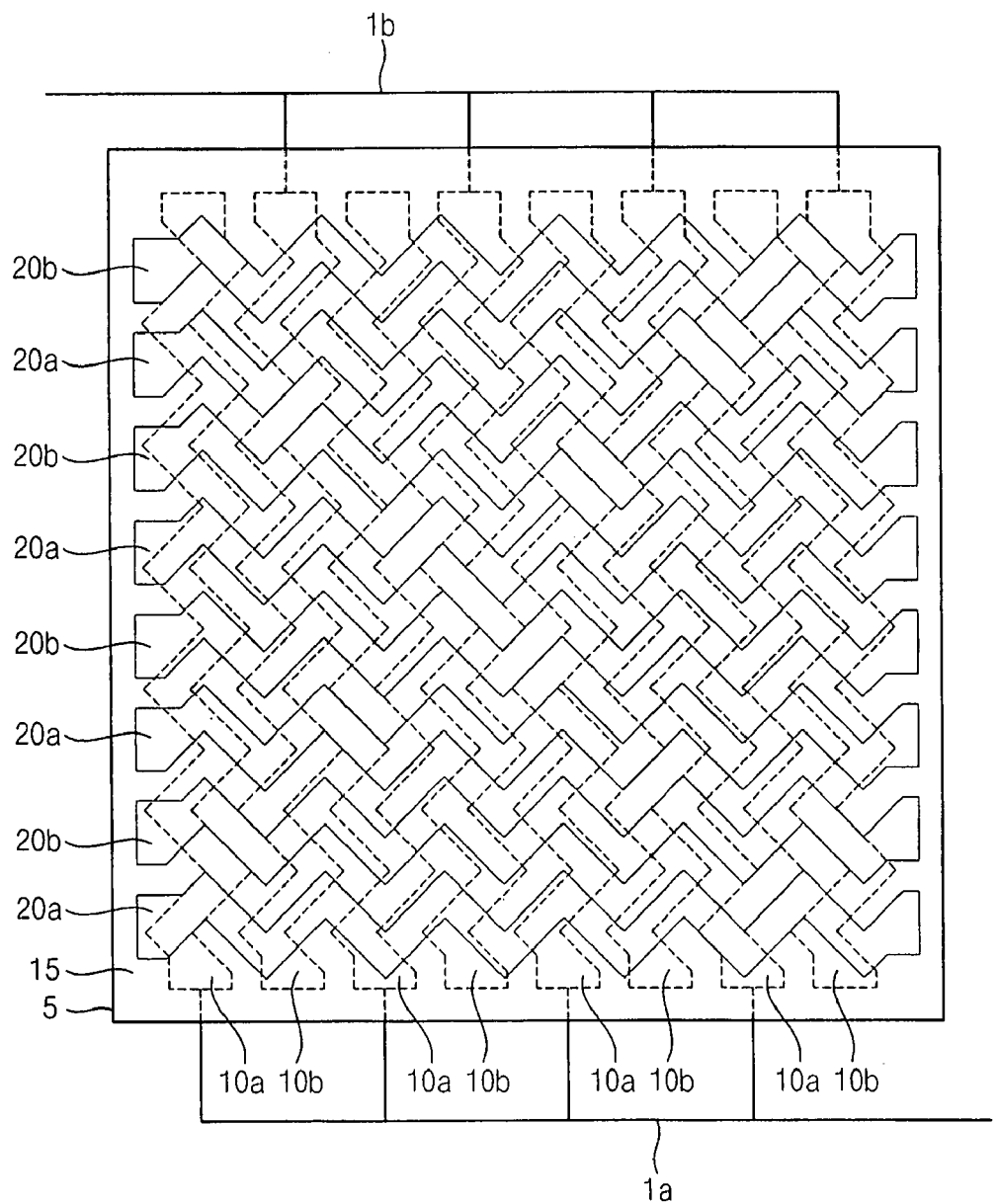
Figure 10:
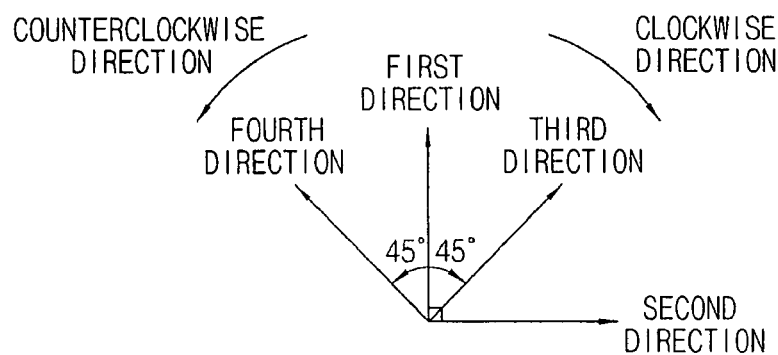

FIGS. 9 and 10 are plan views illustrating an embodiment of a method of forming the capacitor structure in FIG. 8.

Referring to FIG. 9, first and second conductive patterns 10a and 10b are formed on the insulating layer 5. Here, the first and second conductive patterns 10a and 10b are substantially the same as the first and second conductive patterns 10a and 10b in FIGS. 2 and 3. Thus, any further explanation will be omitted.

Referring to FIG. 10, an insulating interlayer 15 is formed on the insulating layer 5 to cover the first and second conductive patterns 10a and 10b. Third and fourth conductive patterns 20a and 20b are then formed on the insulating interlayer 15.

Particularly, the third conductive patterns 20a have the shape of the first conductive patterns 10a rotated clockwise by a third angle θ3. The fourth conductive patterns 20a have the shape of the second conductive patterns 20a rotated clockwise by the third angle θ3.

The third angle θ3 can be between about 0° and about 180°. However, the third angle θ3 in FIG. 11 is depicted as 90° for convenience of explanation. The third and fourth conductive patterns 20a and 20b are alternately arranged in the second direction such that the third and fourth conductive patterns 20b are spaced apart from one another.

As illustrated in FIG. 10, concave portions formed at side faces of the third conductive patterns 20a can horizontally correspond to convex portions formed at side faces of the fourth conductive patterns 20b. In addition, convex portions formed at the side faces of the third conductive patterns 20a can horizontally correspond to concave portions formed at the side faces of the fourth conductive patterns 20b. In this case, the numbers of third and fourth conductive patterns 20a and 20b can increase.

Although not particularly illustrated in the drawings, first and second contacts can be formed. The first contacts can be formed through the insulating interlayer 15 so that the first and third conductive patterns 10a and 20a can be electrically connected to each other by the first contacts. The second contacts can be formed through the insulating interlayer 15 so that the second and fourth conductive patterns 10b and 20b can be electrically connected to each other by the second contacts.

The first contacts can be formed through a portion of the insulating interlayer 15 where the first conductive patterns 10a are overlapped with the third conductive patterns 20a. The second contacts can be formed through a portion of the insulating interlayer 15 where the second conductive patterns 10b are overlapped with the fourth conductive patterns 20b. Processes required for forming the first and second contacts can be substantially the same as those illustrated in FIGS. 5 and 6.

Alternatively, the first contacts need not be formed. In this case, a third conductive line electrically connected to end portions of the third conductive patterns 20a is formed. The third conductive line is then electrically connected to the first conductive line 1a.

In addition, the second contacts need not be formed. In this case, a fourth conductive line electrically connected to end portions of the fourth conductive patterns 20b is formed. The fourth conductive line is then electrically connected to the second conductive line 1b.

The first conductive patterns 10a are not electrically connected to the fourth conductive patterns 20a. In addition, the second conductive patterns 10b are not electrically connected to the third conductive patterns 20a.

That is, the first and third conductive patterns 10a and 20a electrically connected to the each other can form a first electric group. The second and fourth conductive patterns 10b and 20b electrically connected to each other can form a second electric group.

As described above, the insulating interlayer 15 and the third and fourth conductive patterns 20a and 20b can be stacked once. Alternatively, the insulating interlayer 15 and the third and fourth conductive patterns 20a and 20b can be stacked at least twice. In this case, each time the third and fourth conductive patterns 20a and 20b are stacked, the stacked third and fourth conductive patterns 20a and 20b are rotated clockwise by a predetermined angle of between about 0° and about 180°. In addition, the contacts or the conductive line can be repeatedly provided.

FIG. 11 is a plan view illustrating an embodiment of a capacitor structure in accordance with an aspect of the present invention.

Referring to FIG. 11, a capacitor structure includes an insulating layer 5, first conductive patterns 10a, second conductive patterns 10b, an insulating interlayer 15, third conductive patterns 20a, and fourth conductive patterns 20b.

The first and second conductive patterns 10a and 10b can extend in a first direction on the insulating layer 5. In addition, the first and second conductive patterns 10a and 10b are alternately arranged in a second direction substantially perpendicular to the first direction such that the first and second conductive patterns 10a and 10b are spaced from each other.

The first conductive patterns 10a have first planar portions 10a' and first connection portions 10a". The first planar portions 10a' are spaced apart from one another in the first direction. The first connection portions 10a" connect the first planar portions 10a' to each other. The first planar portions 10a' have a first width in the second direction. In addition, the first planar portions 10a' can be substantially symmetric with respect to a central axis of the first conductive patterns 10a. Side faces of the first planar portions 10a' can be bent by a predetermined angle. Thus, an end portion of the first planar portions 10a' connected to the first connection portions 10a' can have a width substantially smaller than that of a central portion of the first planar portions 10a'. For example, the predetermined angle can be about 90°.

As described above, the number of bent portions formed at the side faces of the first planar portions 10a' is one. However, the number of bent portions can be at least two. In case that the number of bent portions increases, interior angles of the bent portions can increase. Thus, the shape of the first planar portions 10a' can become substantially circular.

As described above, the first connection portions 10a" connect the first planar portions 10a' to each other. The first connection portions 10a" have a second width in the second direction. The second width can be substantially smaller than the first width. For example, the first connection portions 10a" can have a substantially bar shape.

The second conductive patterns 10b have second planar portions 10b' and second connection portions 10b". The second planar portions 10b' are arranged in the first direction such that the second planar portions 10b' are spaced apart from one another. The connection portion 10b" can connect the second planar portions 10b' to each other.

The second planar portions 10b' have the first width in the second direction. In addition, the second planar portions 10b' can be substantially symmetrical with respect to a central axis of the second conductive patterns 10b. Side faces of the second planar portions 10b' can be bent by a predetermined angle. Thus, a width of an end portion of the second planar portions 10b' connected to the second connection portions 10b' can be substantially smaller than a width of a central portion of the second planar portions 10b'. The predetermined angle can be about 90°.

As described above, the number of bent portions formed at the side faces of the second planar portions 10b' is one. However, the number of bent portions can be at least two. When the number of bent portions increases, interior angles of the bent portions can increase. Thus, the shape of the second planar portions 10b' can become substantially circular.

As described above, the second connection portions 10b" can connect the second planar portions 10b' to each other. The second connection portions 10b" have the second width in the second direction. The second width is substantially smaller than the first width. For example, the second connection portions 10b" have a substantially bar shape.

The first planar portions 10a' of the first conductive patterns 10a horizontally correspond to the second connection portions 10b" of the second conductive patterns 10b. In addition, the first connection portions 10a" of the first conductive patterns 10a can horizontally correspond to the second planar portions 10b' of the second conductive patterns 10b. In this case, the numbers of first and second conductive patterns 10a and 10b formed on the insulating layer 5 can increase.

The first conductive patterns 10a can be electrically connected to one another by a first conductive line 1a connected to end portions of the first conductive patterns 10a. The second conductive patterns 10b can be electrically connected to one another by a second conductive line 1b connected to end portions of the second conductive patterns 10b.

That is, the first conductive patterns 10a are electrically connected to one another by the first conductive line 1a. In addition, the second conductive patterns 10b are electrically connected to one another by the second conductive line 1b. However, the first conductive patterns 10a are electrically insulated from the second conductive patterns 10b.

An insulating layer 15 is provided on the insulating layer 5 to cover the first and second conductive patterns 10a and 10b. Third and fourth conductive patterns 20a and 20b are provided on the insulating interlayer 15. The third conductive patterns 20a include third planar portions 20a' and third connection portions 20a". The fourth conductive patterns 20b include fourth planar portions 20b' and fourth connection portions 20b".

The third conductive patterns 20a have the shape of the first conductive patterns 10a rotated by about 90° such that the planar portions are overlapped. Thus, the third planar portions 20a' and the third connection portions 20a" horizontally correspond to the first planar portions 10a' and the first connection portions 10a", respectively.

The fourth conductive patterns 20b have the shape of the second conductive patterns 10b rotated by about 90° such that the planar portions are overlapped. Thus, the fourth planar portions 20b' and the fourth connection portions 20b" horizontally correspond to the second planar portions 10b' and the second connection portions 10b", respectively.

Although not particularly illustrated in the drawings, first and second contacts can be formed. The first contacts can be formed through the insulating interlayer 15 to electrically connect the first conductive patterns 10a to the third conductive patterns 20a. The second contacts are formed through the insulating interlayer 15 to electrically connect the second conductive patterns 10b to the fourth conductive patterns 20a.

Particularly, the first contacts are formed through a portion of the insulating interlayer 15 where the first planar portions 10a' and the third planar portions 20a' are overlapped. The second contacts are formed through a portion of the insulating interlayer 15 where the second planar portions 10a" and the fourth planar portions 20b" are overlapped.

In this case, first and second planar portions 10a' and 10b' that have substantially large areas can be formed on the first and second contacts, respectively. Thus, the sizes of the first and second contacts can be enlarged. As a result, a process for forming the first and second contacts can be efficiently performed.

Alternatively, the first contacts need not be formed. In this case, a third conductive line electrically connected to end portions of the third conductive patterns 20a is formed. The third conductive line is then connected to the first conductive line 1a.

In addition, the second contacts need not be formed. In this case, a fourth conductive line electrically connected to end portions of the fourth conductive patterns 20b. The fourth conductive line is then connected to the second conductive line 1b.

The first conductive patterns 10a need not be electrically connected to the fourth conductive patterns 20a. The second conductive patterns 10b are not electrically connected to the third conductive patterns 20a.

That is, the first and third conductive patterns 10a and 20a that are electrically connected to each other can form a first electric group. The second and fourth conductive patterns 10b and 20b that are electrically connected to each other can form a second electric group electrically insulated from the first electric group.

As described above, the insulating interlayer 15 and the third and fourth conductive patterns 20a and 20b can be stacked once. Alternatively, the insulating interlayer 15 and the third and fourth conductive patterns 20a and 20b can be stacked at least twice. In this case, each time the third and fourth conductive patterns 20a and 20b are stacked, the stacked third and fourth conductive patterns 20a and 20b can be rotated by about 90° such that the planar portion are overlapped. In addition, the contacts or the conductive line can be repeatedly provided.

Hereinafter, an embodiment of a method of forming the capacitor structure in FIG. 11 is disclosed.

Figure 12:
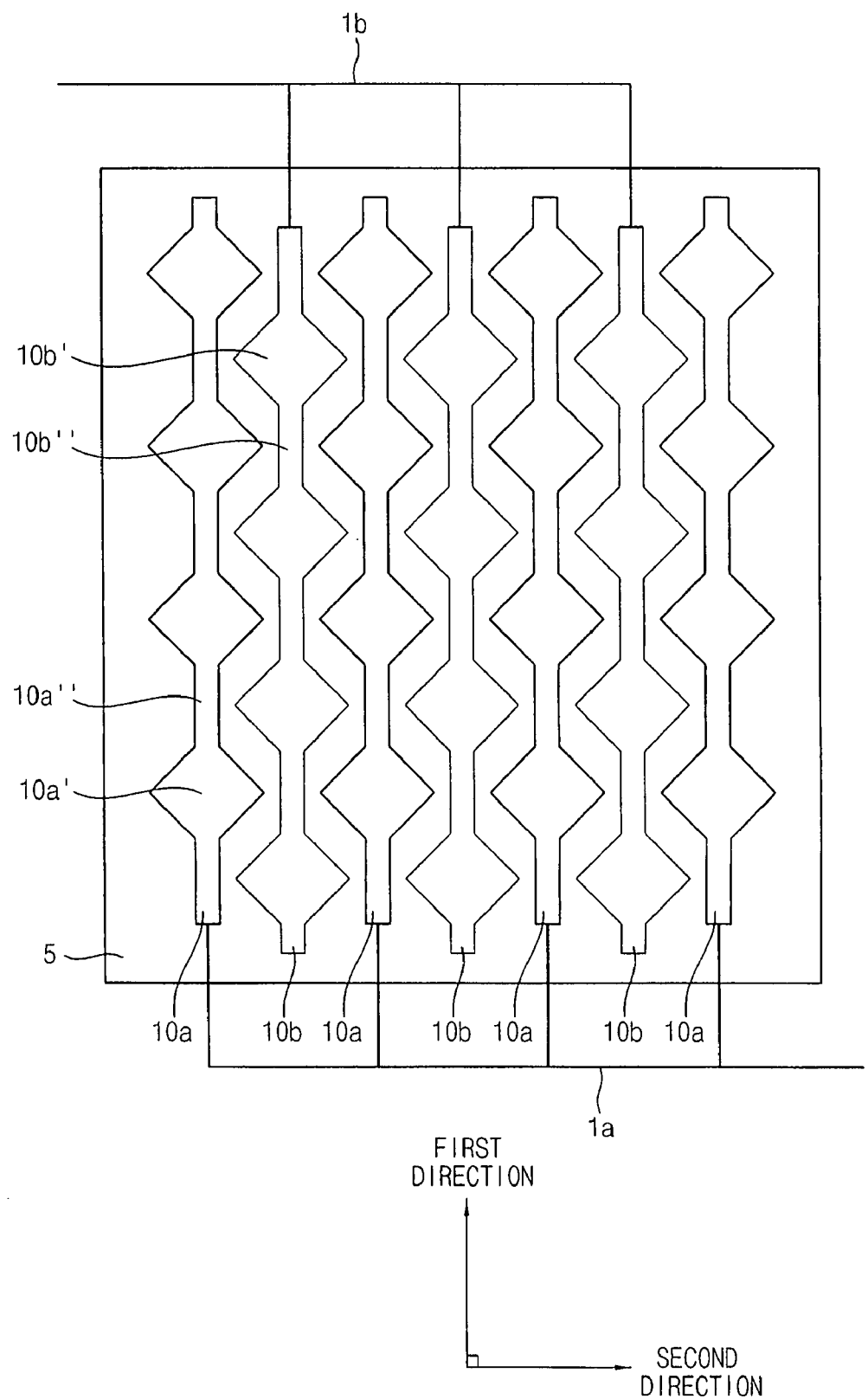
FIGS. 12 and 13 are plan views illustrating an embodiment of a method of forming the capacitor structure in FIG. 11.
Figure 13:
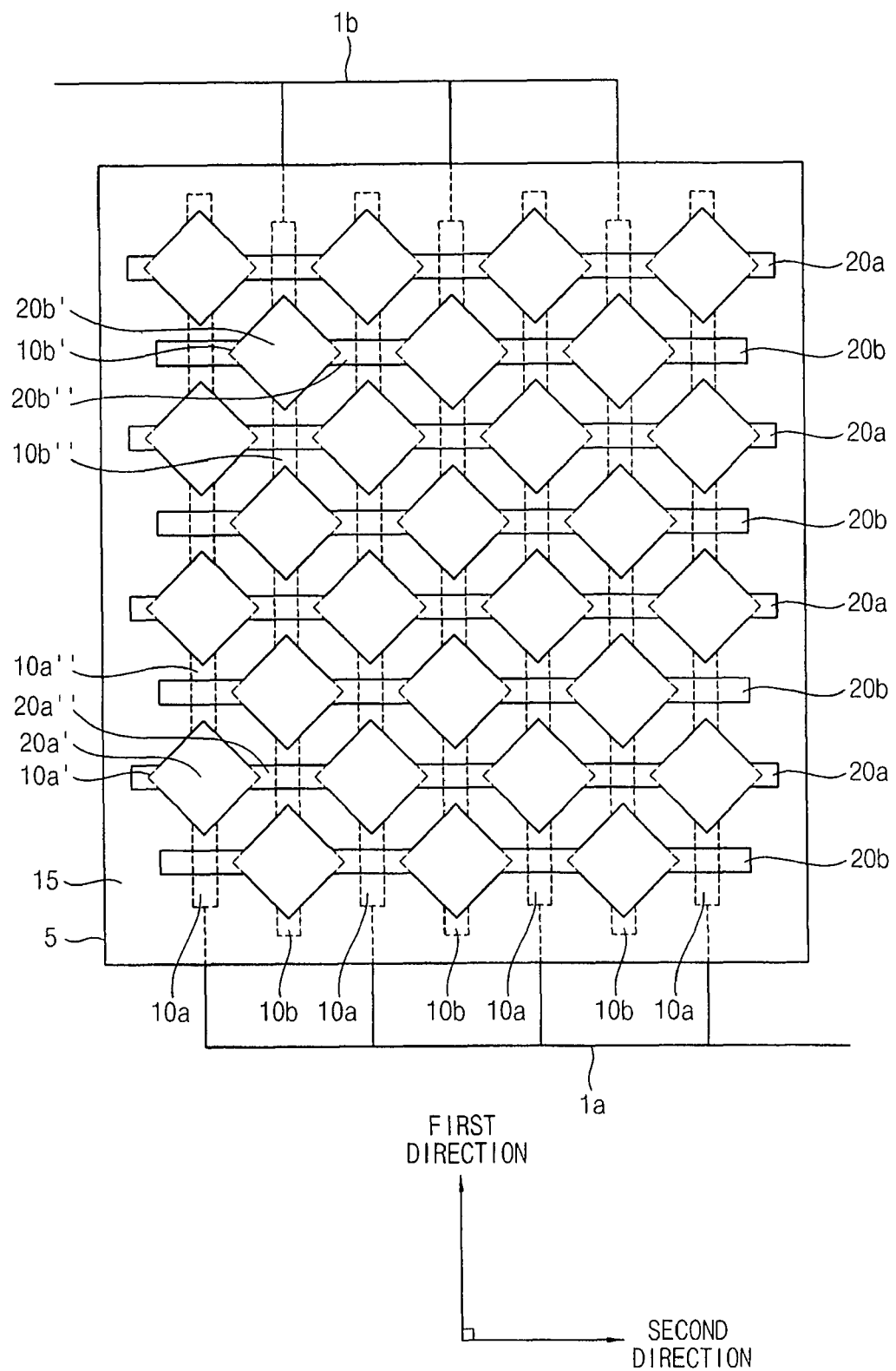

FIGS. 12 and 13 are plan views illustrating a method of forming the capacitor structure in FIG. 11.

Referring to FIG. 12, first and second conductive patterns 10a and 10b are formed on an insulating layer 5. The first and second conductive patterns 10a and 10b extend in a first direction on the insulating layer 5. In addition, the first and second conductive patterns 10a and 10b are alternately arranged in a second direction substantially perpendicular to the first direction such that the first and second conductive patterns 10a and 10b are spaced apart from one another.

The first conductive patterns 10a have first planar portions 10a' and first connection portions 10a". The first planar portions 10a' are spaced apart from one another in the first direction. The first connection portions 10a" are connected between the first planar portions 10a'. The first planar portions 10a' have a first width in the second direction. In addition, the first planar portions 10a' can be substantially symmetric with respect to a central axis of the first conductive patterns 10a. Side faces of the first planar portions 10a' can be bent by a predetermined angle. Thus, a width of an end portion of the first planar portions 10a' connected to the first connection portions 10a' can be substantially smaller than a width of a central portion of the first planar portions 10a'. For example, the predetermined angle can be about 90°.

As described above, the number of bent portions formed at the side faces of the first planar portions 10a' can be one. However, the number of bent portions can be at least two. When the number of bent portions increases, an interior angle can increase. Thus, the shape of the first planar portions 10a' can become substantially circular.

As described above, the first connection portions 10a" are connected between the first planar portions 10a'. The first connection portions 10a" have a second width in the second direction. The second width is substantially smaller than the first width. For example, the first connection portions 10a" have a substantially bar shape.

The second conductive patterns 10b have second planar portions 10b' and second connection portions 10b". The second planar portions 10b' are arranged in the first direction such that the second planar portions 1b' are spaced apart from one another. The second connection portions 10b" are connected between the second planar portions 10b'.

The second planar portions 10b' have the first width in the second direction. In addition, the second planar portions 10b' are substantially symmetric with respect to a central axis of the second conductive patterns 10*b*. Side faces of the second planar portions 10*b*' can be bent by a predetermined angle. Thus, a width of an end portion of the second planar portions 10*b*' connected to the second connection portions 10*b*' can be substantially smaller than a width of a central portion of the second planar portions 10*b*'. The predetermined angle can be about 90°.

As described above, the number of bent portions formed at the side faces of the second planar portions 10*b*' is one. However, the number of bent portions can be at least two. In case that the number of bent portions increases, interior angles of the bent portions can increase. Thus, the shape of the second planar portions 10*b*' can become substantially circular.

As described above, the second connection portions 10*b*" can connect the second planar portions 10*b*'. The second connection portions 10*b*" have the second width in the second direction. The second width is substantially smaller than the first width. For example, the second connection portions 10*b*" can have a substantially bar shape.

As illustrated in FIG. 12, the first planar portions 10*a*' of the first conductive patterns 10*a* can horizontally correspond to the second connection portions 10*b*" of the second conductive patterns 10*b*. In addition, the first connection portions 10*a*" of the first conductive patterns 10*a* can correspond to the second planar portions 10*b*' of the second conductive patterns 10*b*. In this case, the numbers of first and second conductive patterns 10*a* and 10*b* formed on the insulating layer 5 can increase.

The first conductive patterns 10*a* can be electrically connected to each other by a first conductive line 1*a* connected to end portions of the first conductive patterns 10*a*. Here, the first conductive line 1*a* can be integrally formed with the first conductive patterns 10*a*. Alternatively, the first conductive line 1*a* and the first conductive patterns 10*a* can be formed by different processes.

The second conductive patterns 10*b* can be electrically connected to each other by a second conductive line 1*b* connected to end portions of the second conductive patterns 10*b*. Here, the second conductive line 1*b* can be integrally formed with the second conductive patterns 10*b*. Alternatively, the second conductive line 1*b* and the second conductive patterns 10*b* can be formed by different processes.

That is, the first conductive patterns 10*a* can be electrically connected to each other by the first conductive line 1*a*. In addition, the second conductive patterns 10*b* can be electrically connected to each other by the second conductive line 1*b*. However, the first conductive patterns 10*a* can be electrically insulated from the second conductive patterns 10*b*.

Referring to FIG. 13, an insulating interlayer 15 is formed on the insulating layer 5 to cover the first and second conductive patterns 10*a* and 10*b*. Third and fourth conductive patterns 20*a* and 20*b* are formed on the insulating interlayer 15. The third conductive patterns 20*a* have third planar portions 20*a*' and third connection portions 20*a*". The fourth conductive patterns 20*b* have fourth planar portions 20*b*' and fourth connection portions 20*b*".

The third conductive patterns 20*a* have the shape of the first conductive patterns 10*a* rotated by about 90° such that the planar portions are overlapped. Thus, the third planar portions 20*a*' and the third connection portions 20*a*" can vertically correspond to the first planar portions 10*a*' and the first connection portions 10*a*", respectively.

The fourth conductive patterns 20*b* have the shape of the second conductive patterns 10*b* rotated by about 90° such that the planar portions are overlapped. Thus, the fourth planar portions 20*b*' and the fourth connection portions 20*b*" can vertically correspond to the second planar portions 10*b*' and the second connection portions 10*b*", respectively.

Although not particularly illustrated in the drawings, first and second contacts can be formed. The first contacts are formed through the insulating interlayer 15 such that the first contacts electrically connect the first conductive patterns 10*a* to the third conductive patterns 20*a*. The second contacts are formed through the insulating interlayer 15 such that the second contacts electrically connect the second conductive patterns 10*b* to the fourth conductive patterns 20*a*.

Particularly, the first contacts are formed through a portion of the insulating interlayer 15 where the first planar portions 10*a*' and the third planar portions 20*a*' are overlapped. The second contacts are formed through a portion of the insulating interlayer 15 where the second planar portions 10*a*" and the fourth planar portions 20*b*" are overlapped.

In this case, the first and second contacts are formed on the first and second planar portions 10*a*' and 10*b*', respectively. Thus, sizes of the first and second contacts can increase. As a result, processes for forming the first and second contacts can be performed more efficiently. The processes for forming the first and second contacts are substantially the same as those illustrated in FIGS. 5 and 6. Thus, any further explanation will be omitted.

Alternatively, the first contacts need not be formed. In this case, a third conductive line electrically connected to end portions of the third conductive patterns 20*a* is formed. The third conductive line is then connected to the first conductive line 1*a*.

In addition, the second contacts need not be formed. In this case, a fourth conductive line electrically connected to end portions of the fourth conductive patterns 20*b* is formed. The fourth conductive line is then connected to the second conductive line 1*b*.

The first conductive patterns 10*a* need not be electrically connected to the fourth conductive patterns 20*a*. The second conductive patterns 10*b* are not electrically connected to the third conductive patterns 20*a*.

That is, the first and third conductive patterns 10*a* and 20*a* electrically connected to each other form a first electric group. The second and fourth conductive patterns 10*b* and 20*b* electrically connected to each other form a second electric group electrically insulated from the first electric group.

As described above, the insulating interlayer 15 and the third and fourth conductive patterns 20*a* and 20*b* can be stacked once. Alternatively, the insulating interlayer 15 and the third and fourth conductive patterns 20*a* and 20*b* can be stacked at least twice. In this case, each time the third and fourth conductive patterns 20*a* and 20*b* are stacked, the stacked third and fourth conductive patterns 20*a* and 20*b* can be rotated by about 90° such that the planar portion are overlapped. In addition, the contacts or the conductive line can be repeatedly provided.

Figure 14:
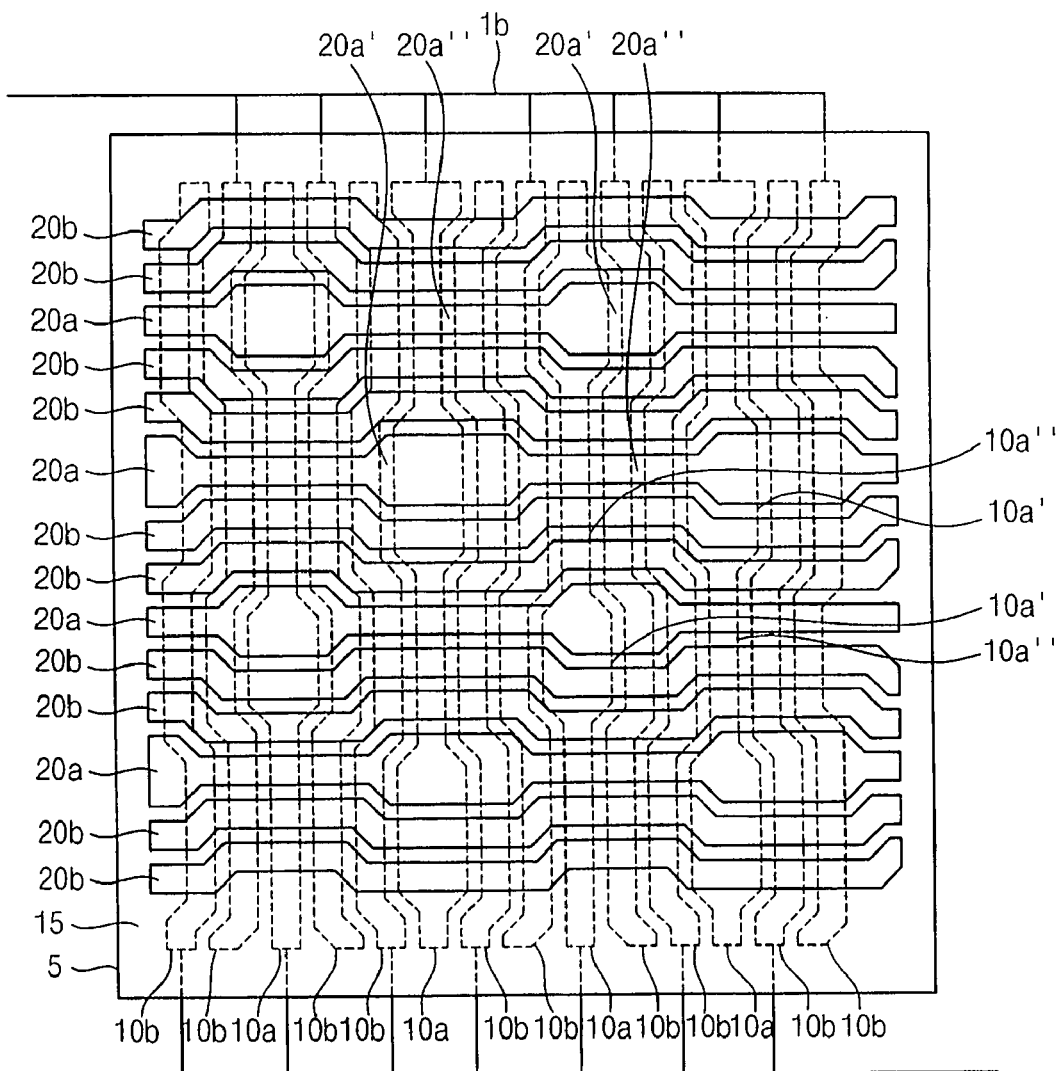
FIG. 14 is a plan view illustrating an embodiment of a capacitor structure in accordance with an aspect of the present invention.
Figure 14:
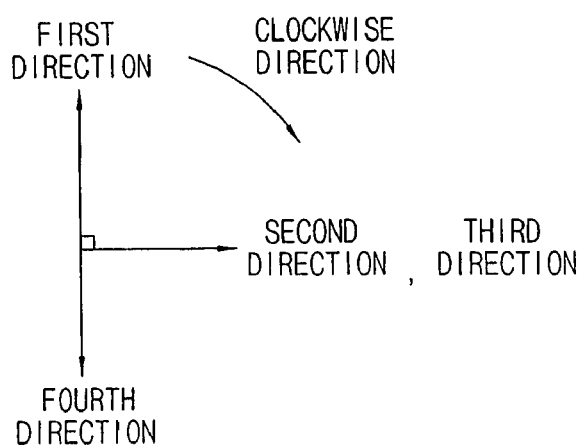

FIG. 14 is a plan view illustrating an embodiment of a capacitor structure in accordance with an aspect of the present invention.

Referring to FIG. 14, a capacitor structure include an insulating layer 5, first conductive patterns 10*a*, second conductive patterns 10*b*, an insulating interlayer 15, third conductive patterns 20*a*, and fourth conductive patterns 20*b*.

The first and second conductive patterns 10*a* and 10*b* are provided on the insulating layer 5. The first conductive patterns 10*a* extends in a first direction on the insulating layer 5. In addition, the first conductive patterns 10*a* have first planar portions 10*a*' and first connection portions 10*a*".

The first planar portions 10*a*' are spaced apart from one another in the first direction. The first connection portions 10a" can connect the first planar portions 10a'. The first planar portions 10a' can have a first width in a second direction rotated clockwise by 90° from the first direction. In addition, the first planar portions 10a' can be substantially symmetric with respect to a central axis of the first conductive patterns 10a. A width of an end portion of the first planar portions 10a' connected to the first connection portions 10a' can be substantially smaller than a width of a central portion of the first planar portions 10a'.

The first conductive patterns 10a are spaced apart from one another in the second direction such that the first planar portions 10a' correspond to the first connection portions 10a" in the second direction. At lease one bent portion is formed at side faces of the first planar portions 10a'. Alternatively, the first planar portions 10a' can have a substantially circular shape.

As described above, the first connection portions 10a" can connect the first planar portions 10a' to each other. The first connection portions 10a" have a second width in the second direction. The second width is substantially smaller than the first width. For example, the first connection portions 10a" can have a substantially bar shape.

At least one of the second conductive patterns 20b is formed between adjacent two first conductive patterns 10a. The second conductive patterns 10b can have a shape extending in the first direction as the first conductive patterns 10a because the second conductive patterns 10b are formed between the first conductive patterns 10a.

The second conductive patterns 10b have a substantially constant width in the second direction. In addition, the second conductive patterns 10b are spaced apart from the first conductive patterns 10a in the second direction by a substantially constant distance. Thus, the side shape of the second conductive patterns 10a can substantially correspond to the side shape of the first conductive patterns 10a.

In addition, when the number of the second conductive patterns 20b formed between adjacent two first conductive patterns 10a is at least two, the second conductive patterns 20b can be spaced apart from each other in the second direction by a substantially constant distance.

Odd-numbered first and second conductive patterns 10a and 10b are electrically connected to one another by a first conductive line 1a connected to end portions of the odd-numbered first and second conductive patterns 10a and 10b. Even-numbered first and second conductive patterns 10a and 10b are connected to one another by a second conductive line 1b electrically connected to end portions of the even-numbered first and second conductive patterns 10a and 10b.

That is, the odd-numbered first and second conductive patterns 10a and 10b are electrically connected to one another by the first conductive line 1a. In addition, the even-numbered first and second conductive patterns 10a and 10b are electrically connected to one another by the second conductive line 1b. However, the odd-numbered first and second conductive patterns 10a and 10b can be electrically insulated from the even-numbered first and second conductive patterns 10a and 10b.

An insulating interlayer 15 is provided on the insulating layer 5 to cover the first and second conductive patterns 10a and 10b. Third and fourth conductive patterns 20a and 20b are provided on the insulating interlayer 15.

The third conductive patterns 20a have a shape extending in a third direction on the insulating interlayer 15. The third direction can be rotated clockwise from the first direction by a predetermined angle. The predetermined angle can be between about 0° and about 180°. However, the predetermined angle in FIG. 14 is depicted as 90° for convenience of explanation. Thus, the third direction can be substantially the same as the first direction in FIG. 14.

The third conductive patterns 20a have second planar portions 20a' and second connection portions 20a". The second planar portions 20a' are spaced apart from one another by the third direction. The second connection portions 20a" connect the second planar portions 20a' to one another. The second planar portions 20a' have a first width in a fourth direction rotated clockwise from the third direction by about 90°. In addition, the second planar portions 20a' can be substantially symmetric with respect to a central axis of the third conductive patterns 20a. A width of the end portion of the second planar portions 20a' connected to the first connection portions 10a' is substantially smaller than a width of a central portion of the second planar portions 20a'.

The third conductive patterns 20a are spaced apart from in the fourth direction such that the second planar portions 20a' correspond to the second connection portions 20a" in the fourth direction. At least one bent portion is formed at side faces of the second planar portions 20a'. Alternatively, the second planar portions 20a' can have a substantially circular shape.

As described above, the second connection portions 20a" connect the second planar portions 20a' to each other. The second connection portions 20a" have a second width in the fourth direction. The second width is substantially smaller than the first width. For example, the second connection portions 20a" can have a substantially bar shape.

At least one of the second conductive patterns 20b is formed between adjacent two third conductive patterns 20a. The fourth conductive patterns 20b can have a shape extending in the third direction because the fourth conductive patterns 20b are formed between the third conductive patterns 20a.

The fourth conductive patterns 20b have a substantially constant width in the fourth direction. The fourth conductive patterns 20b are spaced apart from the third conductive patterns 20a in the fourth direction by a substantially constant distance. Thus, the side shape of the fourth conductive patterns 20a can correspond to the side shape of the third conductive patterns 20a.

In addition, when the number of second conductive patterns 20b formed between adjacent two third conductive patterns 20a is at least two, the second conductive patterns 20b can be spaced apart from each other in the fourth direction by a substantially constant distance.

As described above, the odd-numbered first and second conductive patterns 10a and 10b can be electrically connected to one another by the first conductive line 1a connected to the end portions of the odd-numbered first and second conductive patterns 10a and 10b. Here, the first conductive line 1a can be integrally formed with the odd-numbered first and second conductive patterns 10a and 10b. Alternatively, the first conductive line 1a and the odd-numbered first and second conductive patterns 10a and 10b can be formed by different processes.

As described above, the even-numbered first and second conductive patterns 10a and 10b are electrically connected to one another by the second conductive line 1b connected to the end portions of the second conductive line 1b. Here, the second conductive line 1b can be integrally formed with the even-numbered first and second conductive patterns 10a and 10b. Alternatively, the second conductive line 1b and the even-numbered first and second conductive patterns 10a and 10b can be formed by different processes.

That is, the odd-numbered first and second conductive patterns 10a and 10b can be electrically connected to one another by the first conductive line 1a. In addition, the even-numbered first and second conductive patterns 10a and 10b are electrically connected to one another by the second conductive line 1b. However, the odd-numbered first and second conductive patterns 10a and 10b can be electrically insulated from the even-numbered first and second conductive patterns 10a and 10b.

Although not particularly illustrated in the drawings, first and second contacts can be formed through the insulating interlayer 15. The first contacts can be formed through the insulating interlayer 15 such that the first contacts electrically connect the odd-numbered first and second conductive patterns 10a and 10b to the odd-numbered third and fourth conductive patterns 20a and 20b. The second contacts can be formed through the insulating interlayer 15 such that the second contacts electrically connect the even-numbered first and second conductive patterns 10a and 10b to the even-numbered third and fourth conductive patterns 20a and 20b.

The first contacts are formed through portions of the insulating interlayer 15 where the odd-numbered first and second conductive patterns 10a and 10b are overlapped with the odd-numbered third and fourth conductive patterns 20a and 20b.

Alternatively, the first contacts need not be formed. In this case, a third conductive line electrically connected to end portions of the odd-numbered third and fourth conductive patterns 20a and 20b is formed. The third conductive line is then connected to the first conductive line 1a.

In addition, the second contacts need not be formed. In this case, a fourth conductive line electrically connected to end portions of the even-numbered third and fourth conductive patterns 20a and 20b can be formed. The fourth conductive line is then connected to the second conductive line 1b.

The odd-numbered first and second conductive patterns 10a and 10b need not be electrically connected to the even-numbered third and fourth conductive patterns 20a and 20b. The even-numbered first and second conductive patterns 10a and 10b need not be electrically connected to the odd-numbered third and fourth conductive patterns 20a and 20b.

That is, the odd-numbered first and second conductive patterns 10a and 10b and the odd-numbered third and fourth conductive patterns 20a and 20b form a first electric group. The even-numbered first and second conductive patterns 10a and 10b and the even-numbered third and fourth conductive patterns 20a and 20b form a second electric group electrically insulated from the first electric group.

As described above, the insulating interlayer 15 and the third and fourth conductive patterns 20a and 20b can be stacked once. Alternatively, the insulating interlayer 15 and the third and fourth conductive patterns 20a and 20b can be stacked at least twice. In this case, each time the third and fourth conductive patterns 20a and 20b are stacked, the stacked third and fourth conductive patterns 20a and 20b can be rotated clockwise by a predetermined angle of between about 0° and about 180°. In addition, the contacts or the conductive line can be repeatedly provided.

Hereinafter, an embodiment of a method of forming the capacitor structure in FIG. 14 is described.

Figure 15:
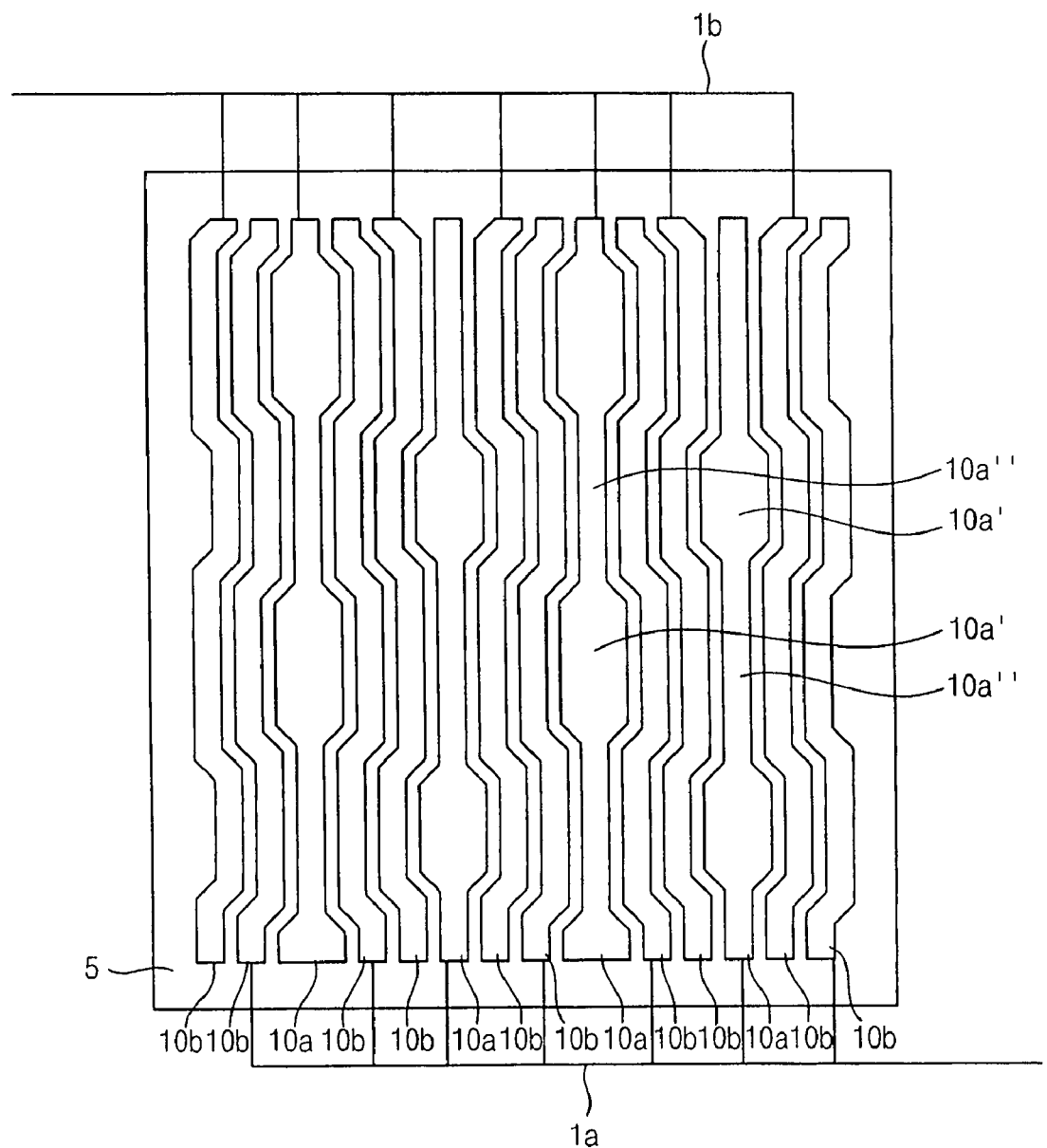
FIGS. 15 and 16 are plan views, illustrating an embodiment of a method of forming the capacitor structure in FIG. 14.
Figure 15:
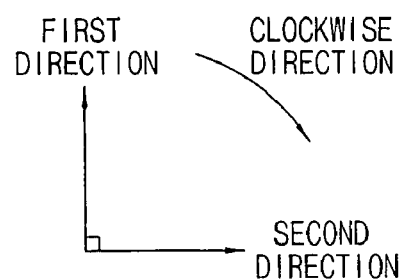
Figure 16:
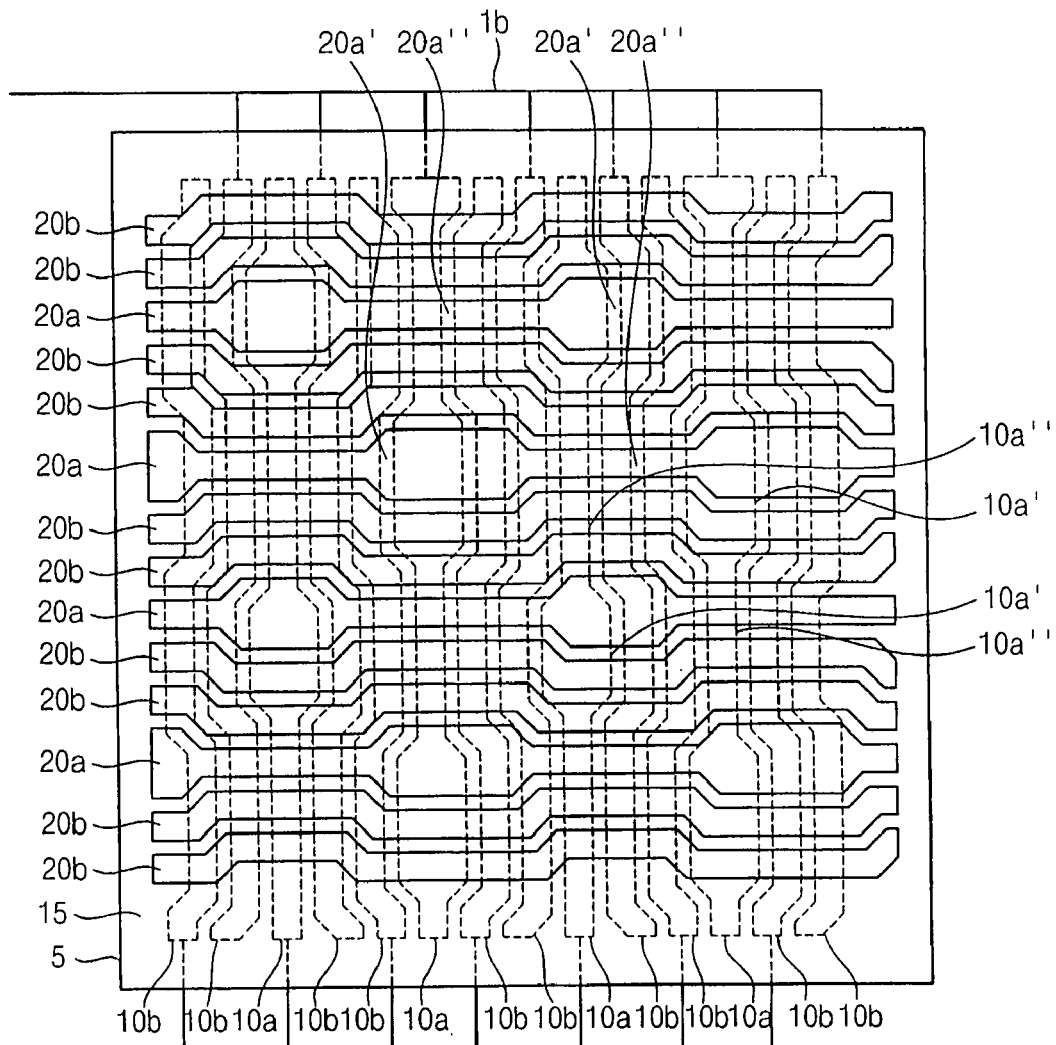
Figure 16:
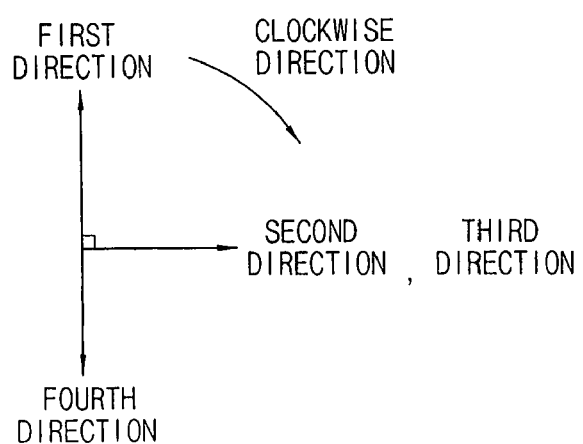

FIGS. 15 and 16 are plan views illustrating a method of forming the capacitor structure in FIG. 14.

Referring to FIG. 15, first and second conductive patterns 10a and 10b are formed on an insulating layer 5. The first conductive patterns 10a have a shape extending in a first direction on the insulating layer 5. In addition, the first conductive patterns 10a have first planar portions 10a' and first connection portions 10a".

The first planar portions 10a' are spaced apart from one another in the first direction. The first connection portions 10a" can connect the first planar portions 10a' to another. The first planar portions 10a' have a first width in a second direction rotated clockwise from the first direction by 90°. In addition, the first planar portions 10a' can be substantially symmetric with respect to a central axis of the first conductive patterns 10a. A width of an end portion of the first planar portions 10a' connected to the first connection portions 10a' can be substantially smaller than a width of a central portion of the first planar portions 10a'.

The first conductive patterns 10a can be spaced apart from one another in the second direction such that the first planar portions 10a' correspond to the first connection portions 10a" in the second direction. At least one bent portion is formed at side faces of the first planar portions 10a'. Alternatively, the first planar portions 10a' can have a substantially circular shape.

As described above, the first connection portions 10a" can connect the first planar portions 10a' to one another. The first connection portions 10a" can have a second width in the second direction. The second width can be substantially smaller than the first width. For example, the first connection portions 10a" can have a substantially bar shape.

At least one of the second conductive patterns 20b is formed between adjacent two first conductive patterns 10a. The second conductive patterns 10b can have a shape extending in the first direction as the first conductive patterns 10a because the second conductive patterns 10b are formed between the first conductive patterns 10a.

The second conductive patterns 10b can have a substantially constant width in the second direction. The second conductive patterns 10b can be spaced apart from the first conductive patterns 10a by a substantially constant distance. Thus, the side shape of the second conductive patterns 10a can correspond to the side shape of the first conductive patterns 10a.

In addition, when the number of second conductive patterns 10a formed between adjacent two first conductive patterns 10a is at least two, the second conductive patterns 20b can be spaced apart from one another in the second direction by substantially constant distances.

The odd-numbered first and second conductive patterns 10a and 10b can be electrically connected to one another by a first conductive line 1a connected to end portions of the odd-numbered first and second conductive patterns 10a and 10b. Here, the first conductive line 1a can be integrally formed with the odd-numbered first and second conductive patterns 10a and 10b. Alternatively, the first conductive line 1a and the odd-numbered first and second conductive patterns 10a and 10b can be formed by substantially different processes.

The even-numbered first and second conductive patterns 10a and 10b can be electrically connected to one another by a second conductive line 1b connected to end portions of the even-numbered first and second conductive patterns 10a and 10b. Here, the second conductive line 1b can be integrally formed with the even-numbered first and second conductive patterns 10a and 10b. Alternatively, the second conductive line 1b and the even-numbered first and second conductive patterns 10a and 10b can be formed by different processes.

That is, the odd-numbered first and second conductive patterns 10a and 10b are electrically connected to one another by the first conductive line 1a. In addition, the even-numbered first and second conductive patterns 10a and 10b can be electrically connected to one another by the second conductive line 1b. However, the odd-numbered first and second conductive patterns 10a and 10b can be electrically insulated from the even-numbered first and second conductive patterns 10a and 10b.

Referring to FIG. 16, an insulating interlayer 15 is formed on the insulating layer 5 to cover the first and second conductive patterns 10a and 10b. After the insulating interlayer 15 is formed, third conductive patterns 20a and fourth conductive patterns 20b are formed on the insulating interlayer 15.

The third conductive patterns 20a have a shape extending in a third direction on the insulating interlayer 15. The third direction is rotated clockwise from the first direction by a predetermined angle. The predetermined angle can be between about 0° and about 180°. However, the predetermined angle is depicted as about 90° in FIG. 16 for convenience of explanation. Thus, the third direction is substantially the same as the second direction in FIG. 16.

The third conductive patterns 20a have second planar portions 20a' and second connection portions 20a". The second planar portions 20a' are spaced apart from one another in the third direction. The second connection portions 20a" connect the second planar portions 20a' to one another. The second planar portions 20a' have a first width in a fourth direction rotated clockwise from the third direction by about 90°. In addition, the second planar portions 20a' can be substantially symmetric with respect to a central axis of the third conductive patterns 20a. A width of an end portion of the second planar portions 20a' can be substantially smaller than a width of a central portion of the second planar portions 20a'.

The third conductive patterns 20a are spaced apart from one another in the fourth direction such that the second planar portions 20a' correspond to the second connection portions 20a" in the fourth direction. At least one bent portion can be formed at side faces of the second planar portions 20a'. Alternatively, the second planar portions 20a' can have a substantially circular shape.

As described above, the second connection portions 20a" can connect the second planar portions 20a' to each other. The second connection portions 20a" have a second width in the fourth direction. The second width is substantially smaller than the first width. For example, the second connection portions 20a" can have a substantially bar shape.

At least one of the second conductive patterns 20b can be formed between adjacent two third conductive patterns 20a. The fourth conductive patterns 20b can have a shape extending in the third direction because the fourth conductive patterns 20b are formed between the third conductive patterns 20a.

The fourth conductive patterns 20b can have a substantially constant width in the fourth direction. The fourth conductive patterns 20b are spaced apart from the third conductive patterns 20a in the fourth direction by a substantially constant distance. Thus, the side shape of the fourth conductive patterns 20a can correspond to the side shape of the third conductive patterns 20a.

In addition, when the number of second conductive patterns 20b formed between adjacent two third conductive patterns 20a is at least two, the second conductive patterns 20b are spaced apart from one another in the fourth direction by substantially constant distances.

Odd-numbered first and second conductive patterns 10a and 10b are electrically connected to one another by a first conductive line 1a connected to end portions of the odd-numbered first and second conductive patterns 10a and 10b. Here, the first conductive line 1a can be integrally formed with the odd-numbered first and second conductive patterns 10a and 10b. Alternatively, the first conductive line 1a and the odd-numbered first and second conductive patterns 10a and 10b can be formed by substantially different processes.

The even-numbered first and second conductive patterns 10a and 10b are electrically connected to one another by a second conductive line 1b connected to end portions of the even-numbered first and second conductive patterns 10a and 10b. Here, the second conductive line 1b can be integrally formed with the even-numbered first and second conductive patterns 10a and 10b. Alternatively, the second conductive line 1b and the even-numbered first and second conductive patterns 10a and 10b can be formed by substantially different processes.

That is, the odd-numbered first and second conductive patterns 10a and 10b are electrically connected to one another by the first conductive line 1a. In addition, the even-numbered first and second conductive patterns 10a and 10b can be electrically connected to one another by the second conductive line 1b. However, the odd-numbered first and second conductive patterns 10a and 10b can be electrically insulated from the even-numbered first and second conductive patterns 10a and 10b.

Although not particularly illustrated in the drawings, first and second contacts can be formed through the insulating interlayer 15. The first contacts can connect the odd-numbered first and second conductive patterns 10a and 10b to the odd-numbered third and fourth conductive patterns 20a and 20b through the insulating interlayer 5. The second contacts can connect the even-numbered first and second conductive patterns 10a and 10b to the even-numbered third and fourth conductive patterns 20a and 20b through the insulating interlayer 15. Processes for forming the first and second contacts can be substantially the same as those illustrated in FIGS. 5 and 6.

The first contacts are formed through portions of the insulating interlayer 15 where the odd-numbered first and second conductive patterns 10a and 10b are overlapped with the odd-numbered third and fourth conductive patterns 20a and 20b.

Alternatively, the first contacts need not be formed. In this case, a third conductive line electrically connected to end portions of the odd-numbered third and fourth conductive patterns 20a and 20b is formed. The third conductive line is then connected to the first conductive line 1a.

In addition, the second contacts need not be formed. In this case, a fourth conductive line electrically connected to end portions of the even-numbered third and fourth conductive patterns 20a and 20b is formed. The fourth conductive line is then connected to the second conductive line 1b.

The odd-numbered first and second conductive patterns 10a and 10b are not electrically connected to the even-numbered third and fourth conductive patterns 20a and 20b. The even-numbered first and second conductive patterns 10a and 10b are not electrically connected to the odd-numbered third and fourth conductive patterns 20a and 20b.

That is, the odd-numbered first and second conductive patterns 10a and 10b and the odd-numbered third and fourth conductive patterns 20a and 20b can form a first electric group. The even-numbered first and second conductive patterns 10a and 10b and the even-numbered third and fourth conductive patterns 20a and 20b can form a second electric group electrically insulated from the first electric group.

As described above, the insulating interlayer 15 and the third and fourth conductive patterns 20a and 20b can be stacked once. Alternatively, the insulating interlayer 15 and the third and fourth conductive patterns 20a and 20b can be stacked at least twice. In this case, each time the third and fourth conductive patterns 20a and 20b are stacked, the stacked third and fourth conductive patterns 20a and 20b can be rotated clockwise by a predetermined angle of between about 0° and about 180°. In addition, the contacts or the conductive line can be repeatedly provided.

According to the present invention, areas of side faces of two conductive patterns that form a capacitor can increase. Thus, the capacitance between the conductive patterns can also increase.

In addition, the conductive patterns can have at least one planar portion on which contacts are to be formed. Thus, the size of the contacts can be enlarged. In addition, processes such as an etching process or a photolithography processes can be efficiently performed to form the contacts.

The foregoing is illustrative of the present invention and is not to be construed as limiting thereof. Although a few embodiments in accordance with this invention have been described, those skilled in the art will readily appreciate that many modifications are possible in the embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A capacitor structure comprising:
an insulating layer;
first and second conductive patterns alternately arranged on the insulating layer and spaced apart from one another, the first and second conductive patterns having side faces where concave portions and convex portions are formed;
an insulating interlayer formed on the insulating layer to cover the first and second conductive patterns; and
third and fourth conductive patterns alternately arranged on the insulating interlayer and spaced apart from one another, the third and fourth conductive patterns having side faces where concave portions and convex portions are formed,
wherein the first and second conductive patterns extend in a first direction, the first and second conductive patterns being alternately arranged to be spaced apart from one another in a second direction substantially perpendicular to the first direction, the first and second conductive patterns having a zigzag shape alternately extending in third and fourth directions, the third direction being rotated clockwise from the first direction by a first angle of between about 0° and about 90°, and the fourth direction being rotated counterclockwise from the first direction by a second angle of between about 0° and about 90°; and
wherein the third and fourth conductive patterns are substantially symmetric with respect to central axes of the first and second conductive patterns, respectively.

2. The capacitor structure of claim 1,
wherein the concave portions and the convex portions are horizontally formed at the side faces of the first conductive patterns and correspond to the convex portions and concave portions that are formed at the side faces of the second conductive patterns adjacent to the first conductive pattern; and
wherein the concave portions and the convex portions are horizontally formed at the side faces of the third conductive patterns and correspond to the convex portions and the concave portions that are formed at the side faces of the fourth conductive patterns adjacent to the third conductive patterns.

3. The capacitor structure of claim 1, further comprising:
a first conductive line electrically connected to end portions of the first conductive patterns; and
a second conductive line electrically connected to end portions of the second conductive patterns.

4. The capacitor structure of claim 3, further comprising:
a third conductive line electrically connected to end portions of the third conductive patterns, the third conductive line being electrically connected to the first conductive line; and
a fourth conductive line electrically connected to end portions of the fourth conductive patterns, the fourth conductive line being electrically connected to the second conductive line.

5. The capacitor structure of claim 1, further comprising:
first contacts formed through portions of the insulating interlayer where the first and third conductive patterns are overlapped, the first contacts connecting the first conductive patterns to the third conductive patterns; and
second contacts formed through portions of the insulating interlayer where the second and fourth conductive patterns are overlapped, the second contacts connecting the second conductive patterns to the fourth conductive patterns.

6. The capacitor structure of claim 1, further comprising
contacts formed through the insulating interlayer that vertically connect the third conductive structures; and
contacts formed through the insulating interlayer that vertically connect the fourth conductive structures,
wherein the insulating interlayer and the third and fourth conductive patterns are repeatedly stacked to be symmetric with respect to the central axes.

7. A capacitor structure comprising:
an insulating layer;
first and second conductive patterns alternately arranged on the insulating layer and spaced apart from one another, the first and second conductive patterns having side faces where concave portions and convex portions are formed;
an insulating interlayer formed on the insulating layer to cover the first and second conductive patterns; and
third and fourth conductive patterns alternately arranged on the insulating interlayer and spaced apart from one another, the third and fourth conductive patterns having side faces where concave portions and convex portions are formed,
wherein the first and second conductive patterns extend in a first direction, the first and second conductive patterns being alternately arranged to be spaced apart from one another in a second direction substantially perpendicular to the first direction, the first and second conductive patterns having a zigzag shape alternately extending in third and fourth directions, the third direction being rotated clockwise from the first direction by a first angle of between about 0° and about 90°, the fourth direction being rotated counterclockwise from the first direction by a second angle of between about 0° and about 90°; and wherein the third and fourth conductive patterns have shapes of the first and second conductive patterns rotated clockwise by a predetermined angle of between about 0° and about 180°.

8. The capacitor structure of claim 7, further comprising:
contacts formed through the insulating interlayer to vertically connect the third conductive structures; and
contacts formed through the insulating interlayer to vertically connect the fourth conductive structures,
wherein the insulating interlayer and the third and fourth conductive patterns are repeatedly stacked and rotated by a predetermined angle with respect to the first direction.

9. A capacitor structure comprising:
an insulating layer;
first and second conductive patterns alternately arranged on the insulating layer and spaced apart from one another, the first and second conductive patterns having side faces where concave portions and convex portions are formed;
an insulating interlayer formed on the insulating layer to cover the first and second conductive patterns; and
third and fourth conductive patterns alternately arranged on the insulating interlayer and spaced apart from one another, the third and fourth conductive patterns having side faces where concave portions and convex portions are formed,
wherein the first and second conductive patterns extend in a first direction, the first and second conductive patterns alternately extending in a second direction substantially perpendicular to the first direction;
wherein the first conductive patterns have first planar portions spaced apart from one another and first connection portions connecting the first planar portions;
wherein the second conductive patterns have second planar portions spaced apart from one another and second connection portions connecting the second planar portions;
wherein the third and fourth conductive patterns have shapes of the third and fourth conductive patterns rotated clockwise by about 90° such that the third and fourth conductive patterns extend in the second direction;
wherein the third conductive patterns have third planar portions spaced apart from one another and third connection portions connecting the third planar portion;
wherein the fourth conductive patterns have fourth planar portions spaced apart from one another and fourth connection portions connecting the fourth planar portions; and
wherein the first and second planar portions are overlapped with the third and fourth planar portions, respectively.

10. The capacitor structure of claim 9, wherein the first planar portions and the first connection portions of the first conductive patterns respectively correspond to the second connection portions and the second planar portions of the second conductive patterns adjacent to the first conductive pattern; and
wherein the third planar portions and the third connection portions of the third conductive patterns respectively correspond to the fourth connection portions and the fourth planar portions of the fourth conductive patterns adjacent to the third conductive patterns.

11. The capacitor structure of claim 9, wherein the first and second planar portions have a first width in the second direction; and
wherein the first and second connection portions have a second width in the second direction, the second width being substantially smaller than the first width.

12. The capacitor structure of claim 9, wherein widths of central portions of the first and second planar portions are substantially larger than widths of end portions of the first and second planar portions connected to the first and second connection portions.

13. The capacitor structure of claim 9, further comprising:
first contacts formed through a portion of the insulating interlayer where the first planar portions and the third planar portions are overlapped, the first contacts electrically connecting the first planar portions to the third planar portions; and
second contacts formed through a portion of the insulating interlayer where the second planar portions and the fourth planar portions are overlapped, the second contacts electrically connecting the second planar portions to the fourth planar portions.

14. The capacitor structure of claim 9, further comprising:
contacts formed through the insulating interlayer to vertically connect the third conductive patterns; and
contacts formed through the insulating interlayer to vertically connect the fourth conductive patterns,
wherein the insulating interlayer and the third and fourth conductive patterns are repeatedly stacked to be rotated clockwise by about 90° with respect to the first direction.

15. A capacitor structure comprising:
an insulating layer;
first and second conductive patterns alternately arranged on the insulating layer and spaced apart from one another, the first and second conductive patterns having side faces where concave portions and convex portions are formed;
an insulating interlayer formed on the insulating layer to cover the first and second conductive patterns;
third and fourth conductive patterns alternately arranged on the insulating interlayer and spaced apart from one another, the third and fourth conductive patterns having side faces where concave portions and convex portions are formed,
a first conductive line electrically connected to end portions of odd-numbered first and second conductive patterns; and
a second conductive line electrically connected to end portions of even-numbered first and second conductive patterns.

16. The capacitor structure of claim 15, further comprising:
a third conductive line electrically connected to end portions of odd-numbered third and fourth conductive patterns, the third conductive line being electrically connected to the first conductive line; and
a fourth conductive line electrically connected to end portions of even-numbered third and fourth conductive patterns, the fourth conductive line being electrically connected to the second conductive line.

17. The capacitor structure of claim 15, further comprising:
first contacts formed through portions of the insulating interlayer where odd-numbered first and second conductive patterns are overlapped with odd-numbered third and fourth conductive patterns to electrically connect the odd-numbered first and second conductive patterns to the odd-numbered third and fourth conductive patterns; and
second contacts formed through portions of the insulating interlayer where even-numbered first and second conductive patterns are overlapped with even-numbered third and fourth conductive patterns to electrically connect the even-numbered first and second conductive patterns to the even-numbered third and fourth conductive patterns.

18. The capacitor structure of claim 15, wherein the first and second conductive patterns have shapes extending in a first direction;
- wherein the first conductive patterns have planar portions spaced apart from each other and connection portions connecting the planar portions, the planar portions having a first width, and the connection portions having a second width substantially smaller than the first width;
- wherein a width of the second conductive patterns is substantially uniformly maintained, the number of second conductive patterns located between adjacent two first conductive patterns being at least two;
- wherein a distance between the first and second conductive patterns and a distance between the second conductive patterns between the adjacent two first conductive patterns are each substantially uniformly maintained; and
- wherein the third and fourth conductive patterns have shapes of the first and second conductive patterns, respectively, rotated clockwise by a predetermined angle of between about 0° and about 180° with respect to the first direction.

19. The capacitor structure of claim 18, further comprising:
- contacts formed through the insulating interlayer to vertically connect the odd-numbered third conductive patterns and to vertically connect the odd-numbered fourth conductive patterns; and
- contacts formed through the insulating interlayer to vertically connect the even-numbered third conductive patterns and to vertically connect the even-numbered fourth conductive patterns,
- wherein the insulating interlayer and the third and fourth conductive patterns are repeatedly stacked to be rotated clockwise by a predetermined angle of between 0° and 180° with respect to the first direction.

* * * * *